(12) United States Patent  
Kummer et al.

(10) Patent No.: US 8,268,037 B2  
(45) Date of Patent: Sep. 18, 2012

(54) RECOVERY OF MOLYBDENUM FROM MOLYBDENUM BEARING SULFIDE MATERIALS BY BIOLEACHING IN THE PRESENCE OF IRON

(75) Inventors: Wolfgang Kummer, Goslar (DE); Wilfried Gutknecht, Goslar (DE); James Gregory Olson, Arvada, CO (US); Thomas R. Clark, Lakewood, CO (US)

(73) Assignee: H.C. Starck GmbH (DE)

( * ) Notice: Subject to any disclaimer, the term of this patent is extended or adjusted under 35 U.S.C. 154(b) by 490 days.

(21) Appl. No.: 12/375,955

(22) PCT Filed: Jul. 19, 2007

(86) PCT No.: PCT/EP2007/057455  
§ 371 (c)(1),  
(2), (4) Date: Mar. 5, 2009

(87) PCT Pub. No.: WO2008/015108  
PCT Pub. Date: Feb. 7, 2008

(65) Prior Publication Data  
US 2009/0320648 A1    Dec. 31, 2009

Related U.S. Application Data

(60) Provisional application No. 60/834,964, filed on Aug. 2, 2006.

(51) Int. Cl.  
*C22B 3/18* (2006.01)  
*C22B 3/06* (2006.01)

(52) U.S. Cl. ........................... 75/712; 75/743

(58) Field of Classification Search .................. 75/712, 75/743  
See application file for complete search history.

(56) References Cited

U.S. PATENT DOCUMENTS 2,829,964 A * 4/1958 Zimmerley et al. ............. 75/731  
(Continued)

FOREIGN PATENT DOCUMENTS

AU        658423 B2    4/1995  
(Continued)

OTHER PUBLICATIONS

Sand et al. "(Bio)chemistry of bacterial leaching—direct vs. indirect bioleaching", 2001 (no month) Hydrometallurgy vol. 59 pp. 159-175.*

(Continued)

*Primary Examiner* — George Wyszomierski  
*Assistant Examiner* — Tima M McGuthry Banks  
(74) *Attorney, Agent, or Firm* — Connolly Bove Lodge & Hutz LLP

(57) ABSTRACT

The invention relates to a method of recovering molybdenum from a molybdenum bearing sulfide material. The material is contacted with a leaching solution in the presence of iron compounds and mesophilic or thermophilic iron oxidizing microorganisms and subsequently, a leaching process is performed by controlling the molar ratio of dissolved ferric iron to dissolved molybdenum. Preferably, a high amount and molar excess of dissolved iron is used. The presence of high concentrations of ferric iron in bioleach solutions allows iron-oxidizing microorganisms to grow and oxidize iron and bioleach molybdenite at dissolved Mo concentrations as high as 4.4 g/L. Organic metabolites were not required for protecting cells from Mo toxicity. Maximum dissolution rates depend on reactor configuration, with agglomerated material simulating heap leaching of almost 1% Mo/day, but up to 10.2% Mo/day in suspension/stirred reactor configurations, with rate highly dependent on temperature within the range of 25° C. to 40° C. The ultimate extent of Mo removal from the molybdenum bearing sulfide material is 89%. Finally, molybdenum is recovered from a leach residue of the leaching process.

29 Claims, 12 Drawing Sheets

U.S. PATENT DOCUMENTS 6,277,341 B1 * 8/2001 Pinches et al. .................. 423/27
6,833,020 B1 12/2004 Dew et al.

FOREIGN PATENT DOCUMENTS

| EP | 0004431 A1 | 10/1979 |
|---|---|---|
| EP | 0808910 A2 | 11/1997 |
| GB | 1542600 | 3/1979 |
| WO | WO-92/16667 A1 | 10/1992 |

OTHER PUBLICATIONS

Zamani et al. Bioleaching of Sarcheshmeh molybdenite concentrate for extraction of rhenium, 2005 (online Aug. 2005) Hydrometallurgy 80 pp. 23-31.*

Schippers, A., et al., "Bacterial leaching of metal sulfides proceeds by two indirect mechanisms via thiosulfate or via polysulfides and sulfur," Applied and Environmental Microbiology, 1999, vol. 65, No. 1, pp. 319-321.

Romano, P., et al., Comparative study on the selective chalcopyrite bioleaching of a molybdenite concentrate with mesophilic and thermophilic bacteria, FEMS Microbiology Letters, 2001, vol. 196, pp. 71-75.

Bryner, L.C., et al., "Microorganisms in leaching sulfide minerals," Industrial and Engineering Chemistry, 1957, vol. 49, No. 10, pp. 1721-1724.

Karavaiko, G.I., et al., (Salley, J., et al. (eds,)), "*Thiobacillus ferrooxidans* resistance to molybdenum," Biohydrometallurgy, Proceedings of the International Symposium, CANMET SP89-10, 1989, pp. 461-473.

Naserjejad, B., et al., "Bioleaching of molybdenum from low-grade copper ore," Process Biochemistry, 2000, vol. 35, pp. 437-440.

Brierley, C.L., et al., "Leaching: use of a thermophilic and chemoautotrophic microbe," Science, 1973, vol. 179, pp. 488-490.

Duncan, D.W., et al., "Recent advances in the microbiological leaching of sulfides," AIME Transactions, 1967, vol. 238, pp. 122-128.

Askari Zamani, M.A., et al., "Selective copper dissolution during bioleaching of molybdenum concentrate, "Int. J. Miner. Process., 2006, vol. 81, pp. 105-112.

Yahya, A., et al., "Bioleaching of pyrite at low pH and low redox potentials by novel mesophilic Gram-positive bacteria," Hydrometallurgy, 2002, vol. 63, pp. 181-188.

Tuovinen, O.H., et al., Biology of *Thiobacillus ferrooxidans* in relation to the microbiological leaching of sulphide ores, Zeitschrift fur Allg. Mikrobiologie, 1972, vol. 12, No. 4, pp. 311-346.

Bryner, L.C., et al., "Microorganisms in leaching sulfide minerals," Industrial and Engineering Chemistry, 1954, vol. 46, No. 12, pp. 2587-2592.

Tributsch, H., et al, "Semiconductor-electrochemical aspects of bacterial leaching. Part 2. Survey of rate-controlling sulphide properties," J. Chem. Tech. Biotechnol., 1981, vol. 31, pp. 627-635.

Tributsch, H., et al, "Semiconductor-electrochemical aspects of bacterial leaching. I. Oxidation of metal sulphides with large energy gaps" J. Chem. Tech. Biotechnol., 1981, vol. 31, pp. 565-577.

Romano, P., et al., Reactivity of a molybdenite concentrate against chemical or bacterial attack, Minerals Engineering, 2001, vol. 14, No. 9, pp. 987-996.

Kelley, B.C., Biological contributions to mineral cycling in nature with reference to molybdenum, Polyhedron, 1986, vol. 5, No. 1/2, pp. 597-606.

Norris, P.R., et al., (Norris, P.R. et al. (eds.), "Iron and mineral oxidation by *acidiphilic* bacteria: affinities for iron and attachment to pyrite," Biohydrometallurgy, Proceedings of the International Symposium, 1987, pp. 43-59.

* cited by examiner

Fig. 1 Minimum Inhibitory Concentration of Mo Species toward Iron-Oxidizing Bacteria
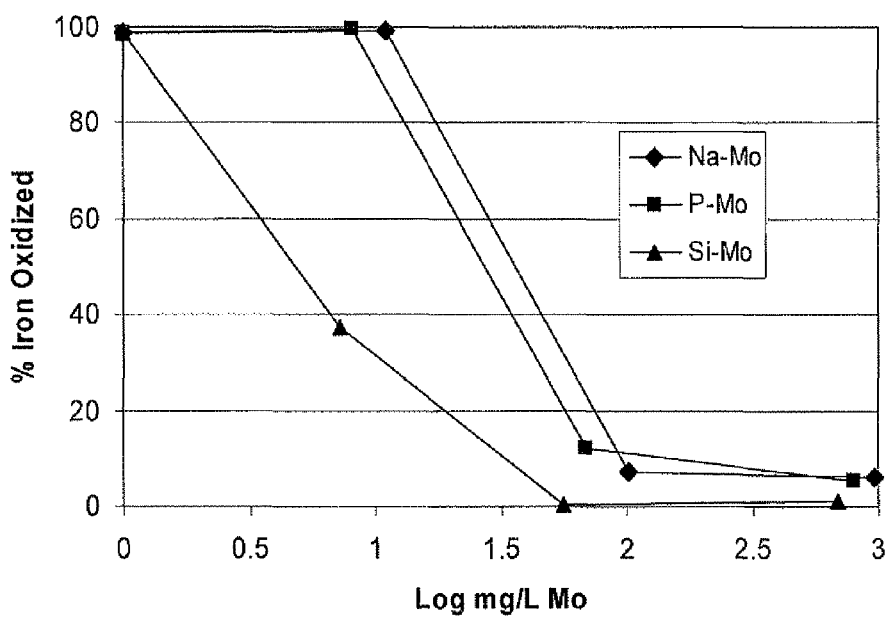
Fig. 2 Time course of Fe(II) biooxidation in the presence of Mo
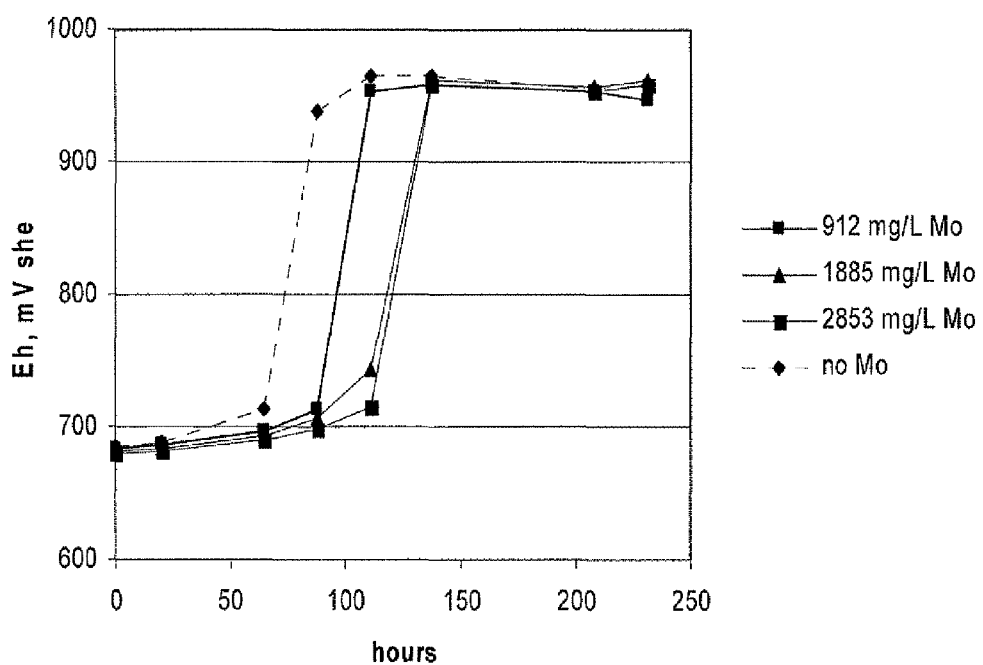

Fig. 3 Solution Eh in MoS$_2$-Containing Flasks Containing Different Amounts of Added Ferric Iron.
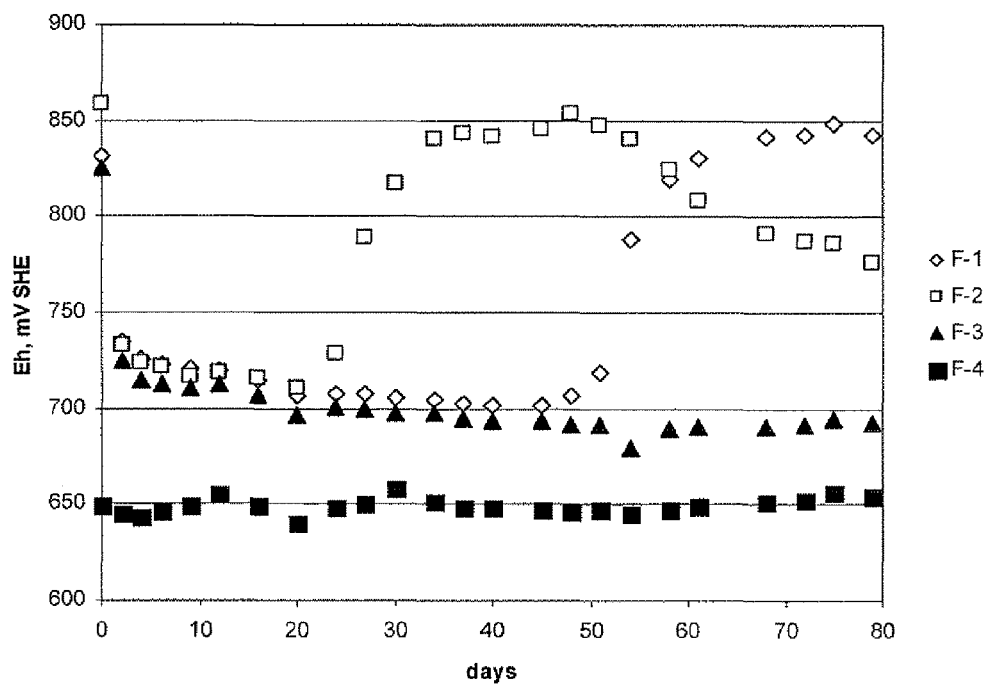
Fig. 4 Bioleaching of MoS$_2$ with Various Amounts of Added Ferric Iron.
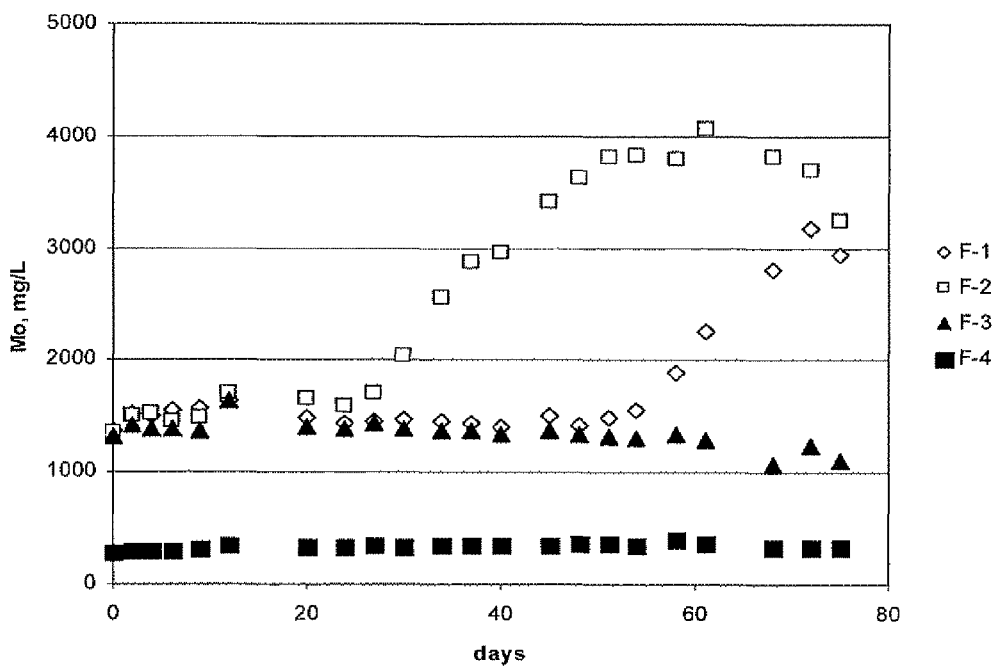

Fig. 5 Relationship between particle size and bioleaching rate of MoS$_2$.
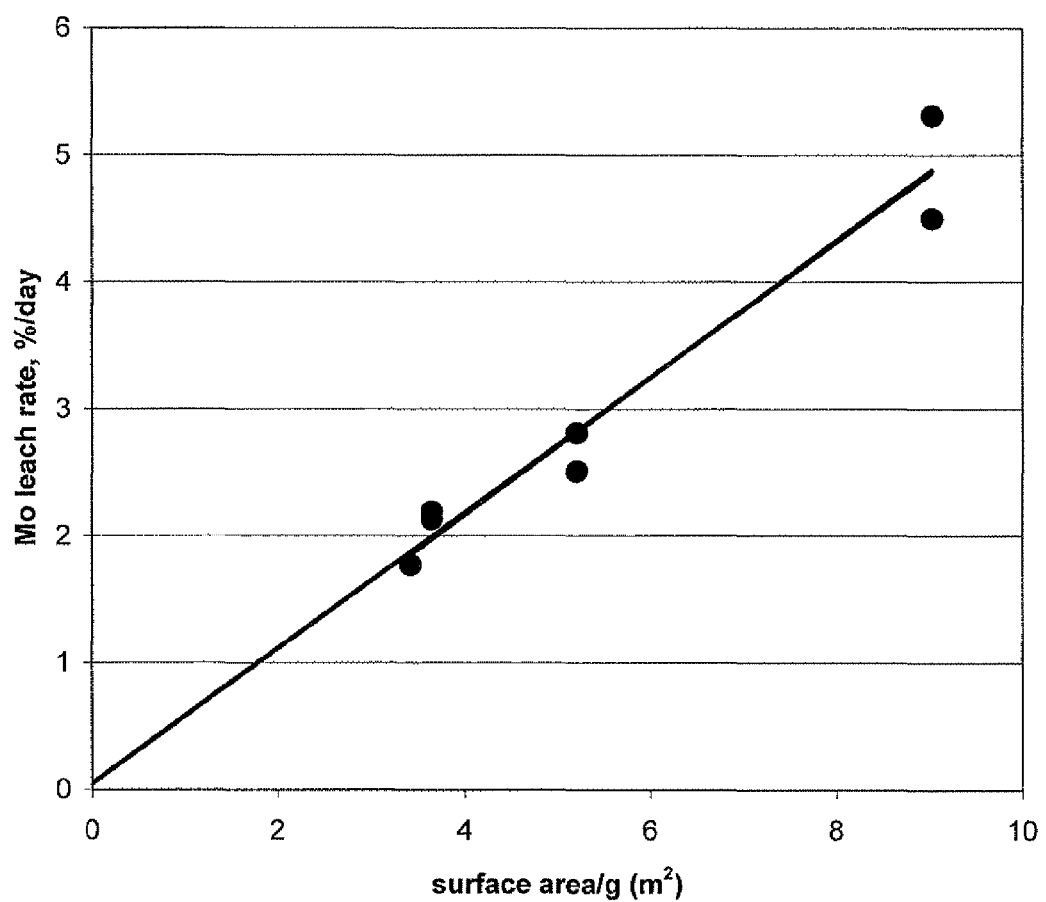

Fig. 6 Dissolution of Mo and Cu from a long-term column under mesophilic conditions
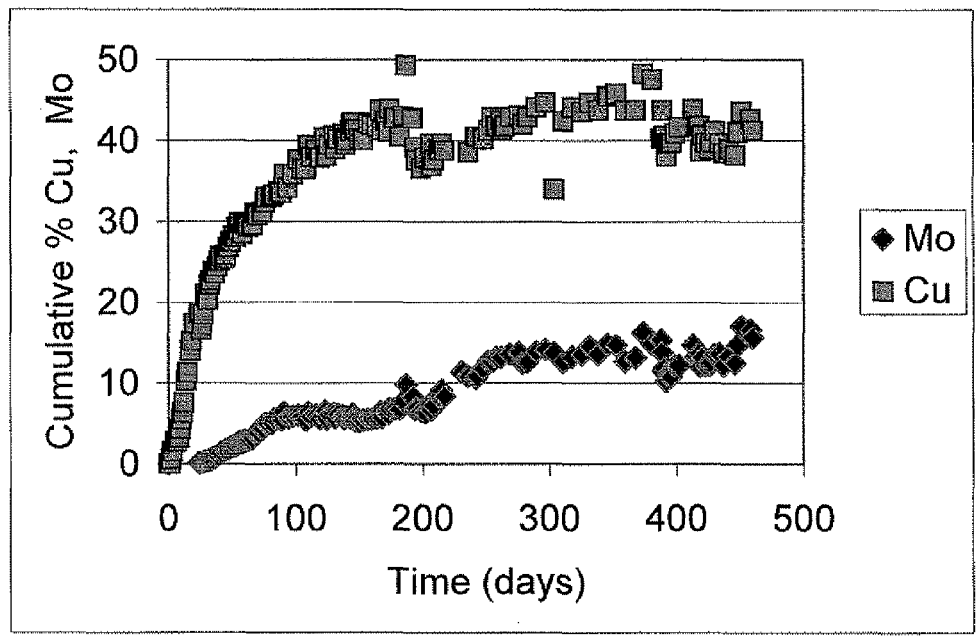
Fig. 7 Effect of modifications to leach solution Fe concentration on Mo dissolution
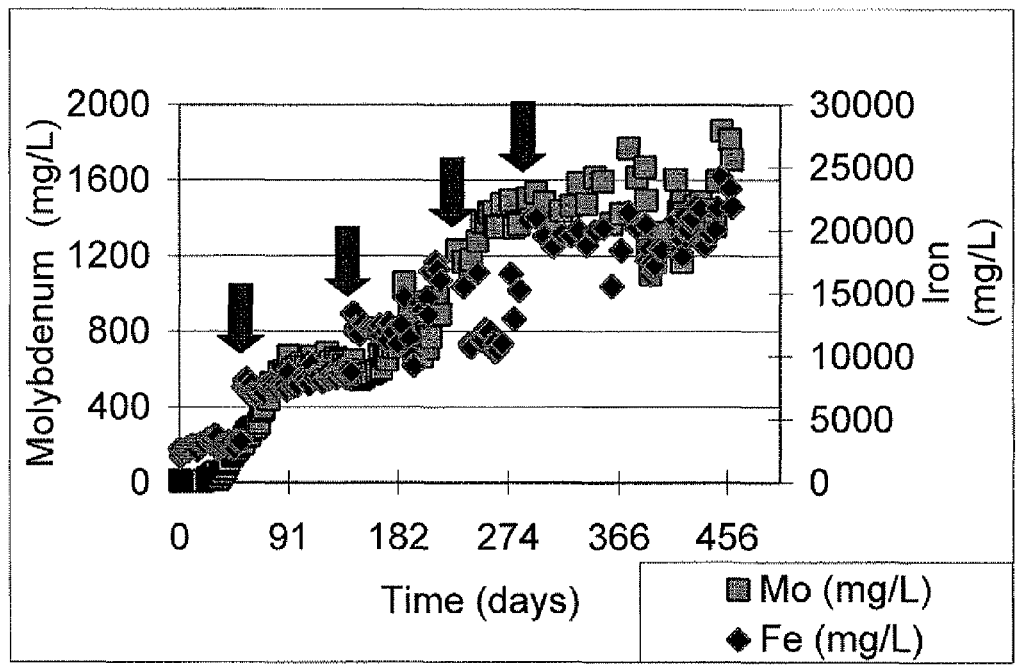

Fig. 8 Leach solution oxidation-reduction potential upon modification of Fe-concentration of leach solution
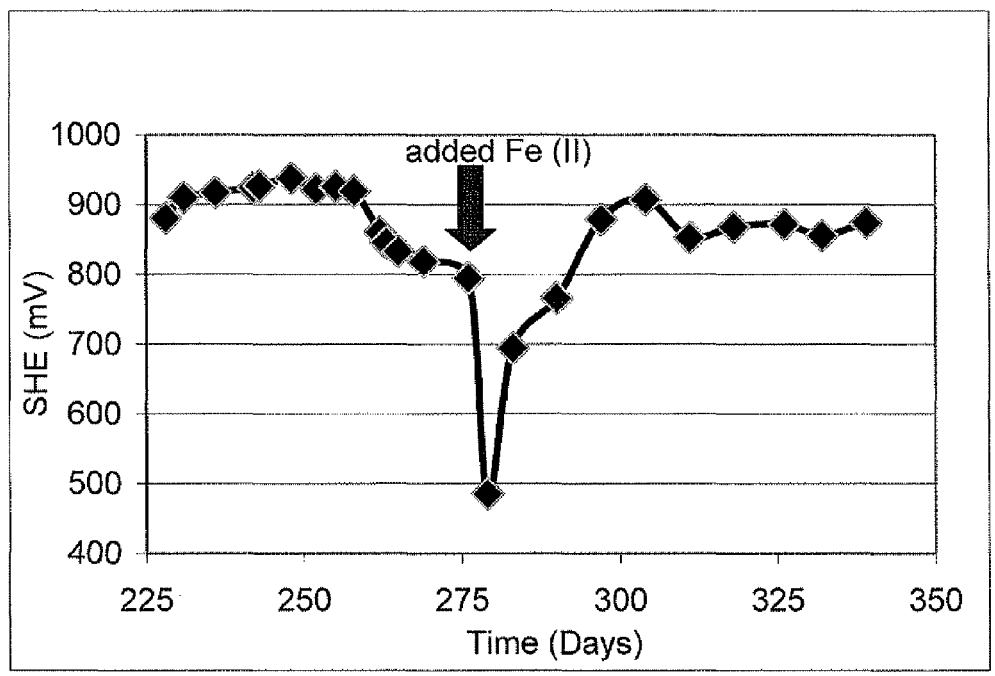
Fig. 9 Dissolution of Mo and Cu from a long-term adaptation column under mesophilic conditions
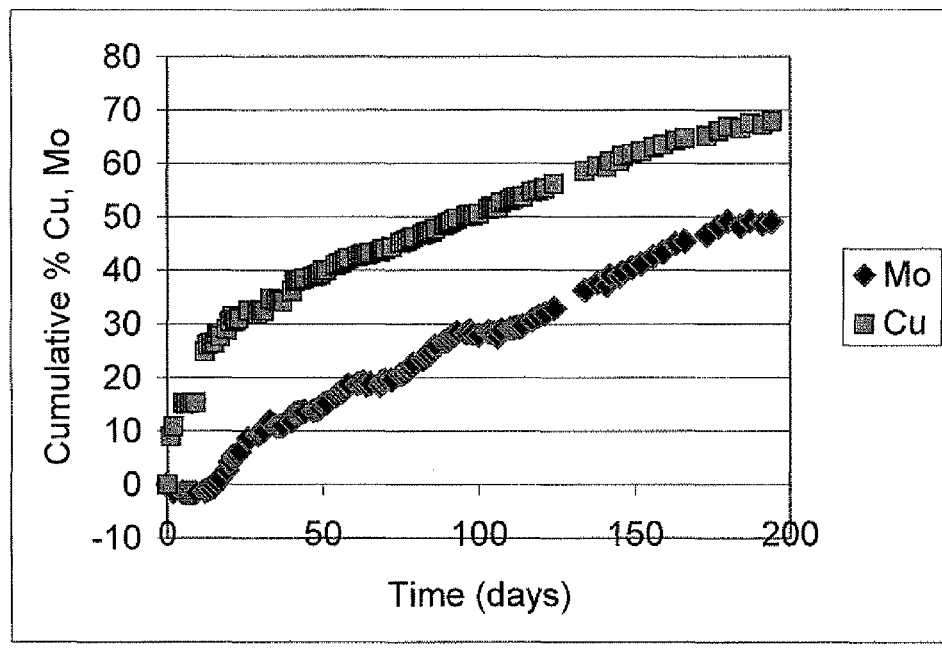

Fig. 10 Manipulation of iron concentrations in leach solution
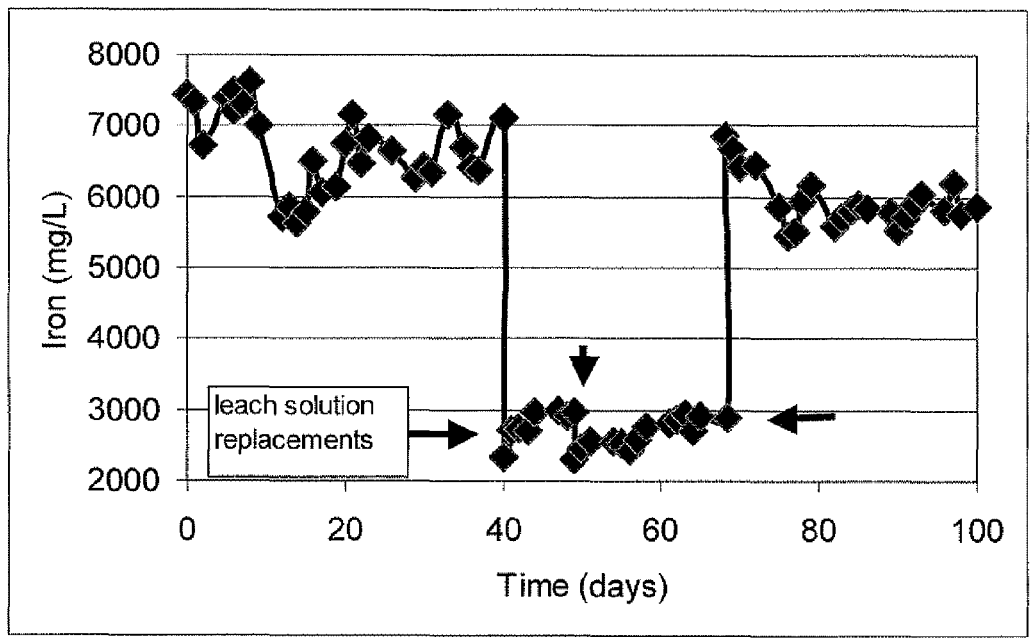
Fig. 11 Mo concentrations in leach solution corresponding to manipulations of solution iron concentrations
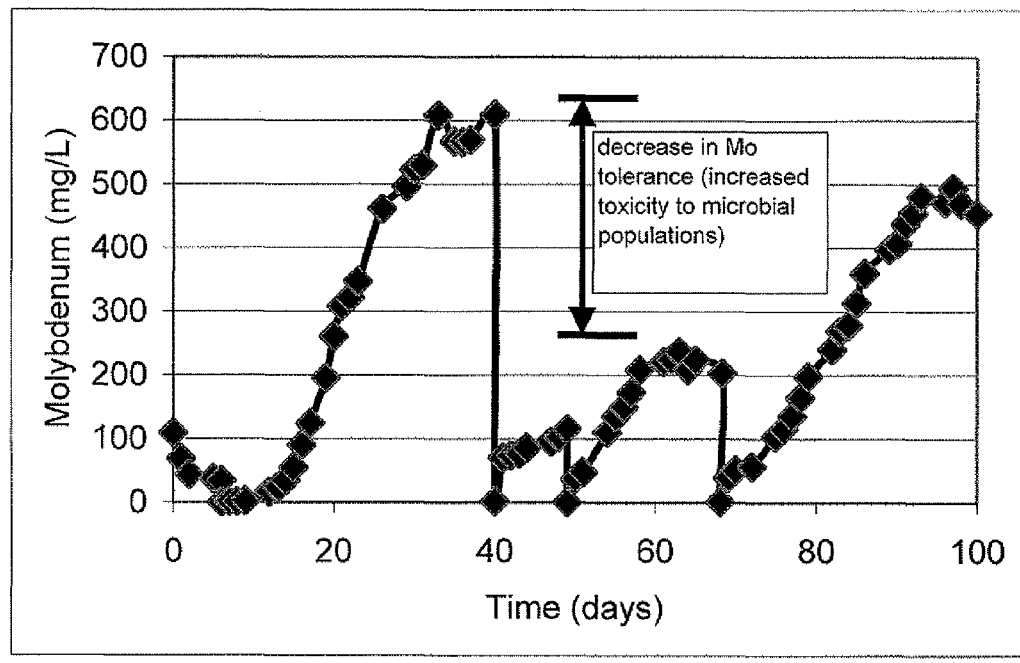

Fig. 12 Solution oxidation-reduction potentials during manipulation of solution iron concentrations
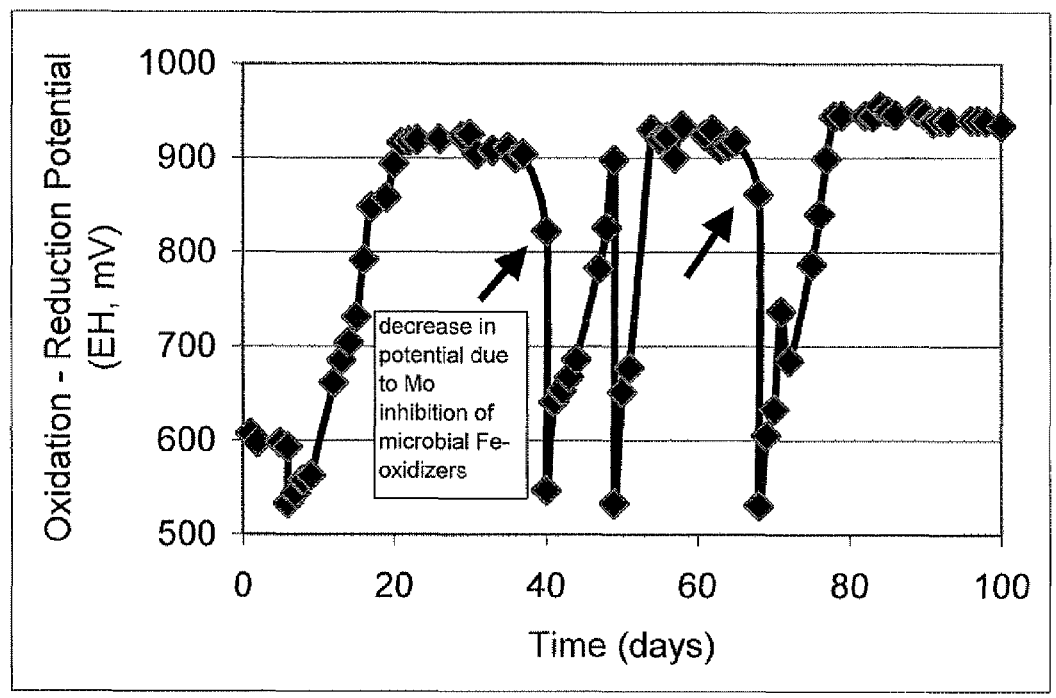
Fig. 13 Influent and effluent leach solution Fe concentrations
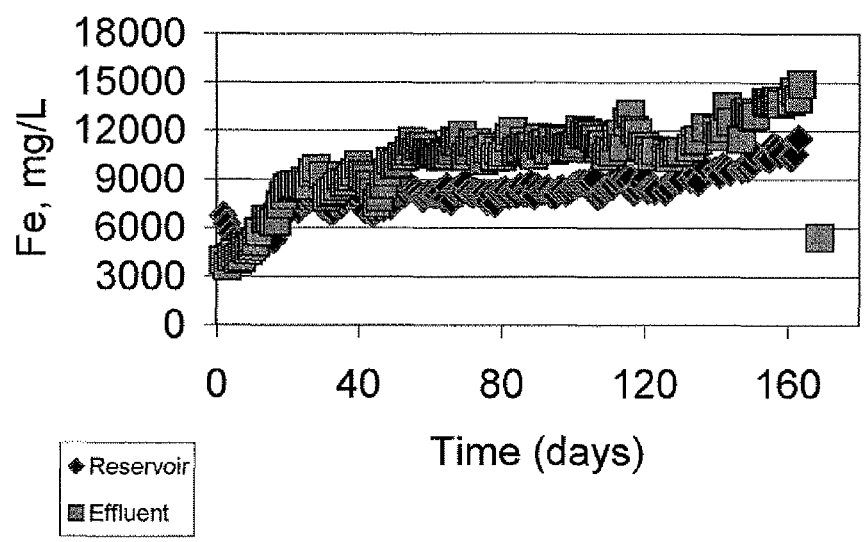

Fig. 14 Effluent pH of leach solution from a 1.5-meter bed
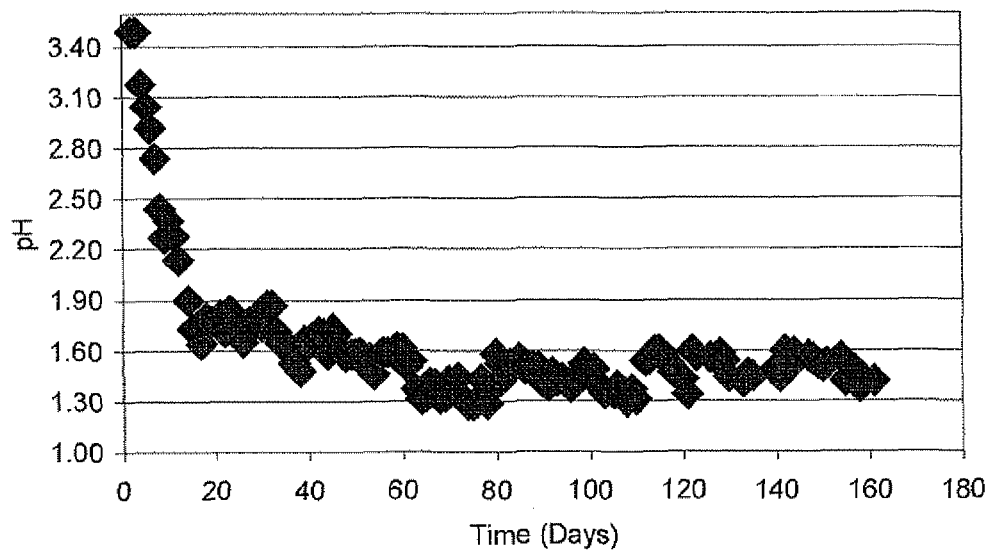
Fig. 15 Effluent oxidation – reduction potential from a 1.5 - meter bed
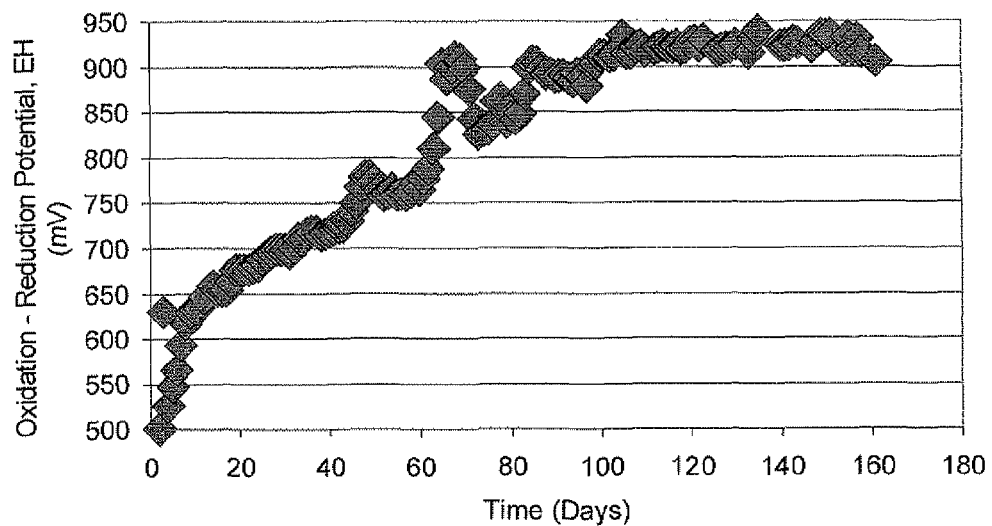

Fig. 16 Normalized daily rate of Mo solubilization from a 1.5-meter bed
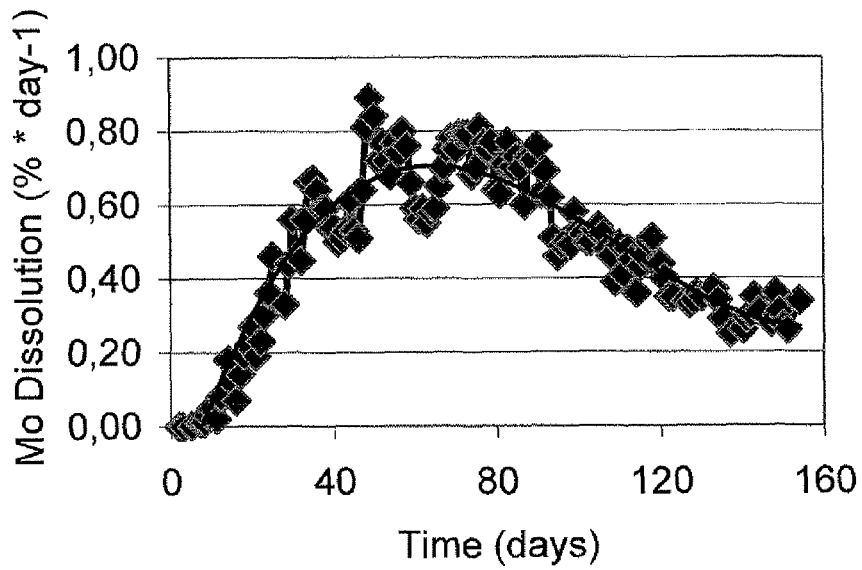
Fig. 17 Comparison of Mo dissolution from small and large laboratory columns
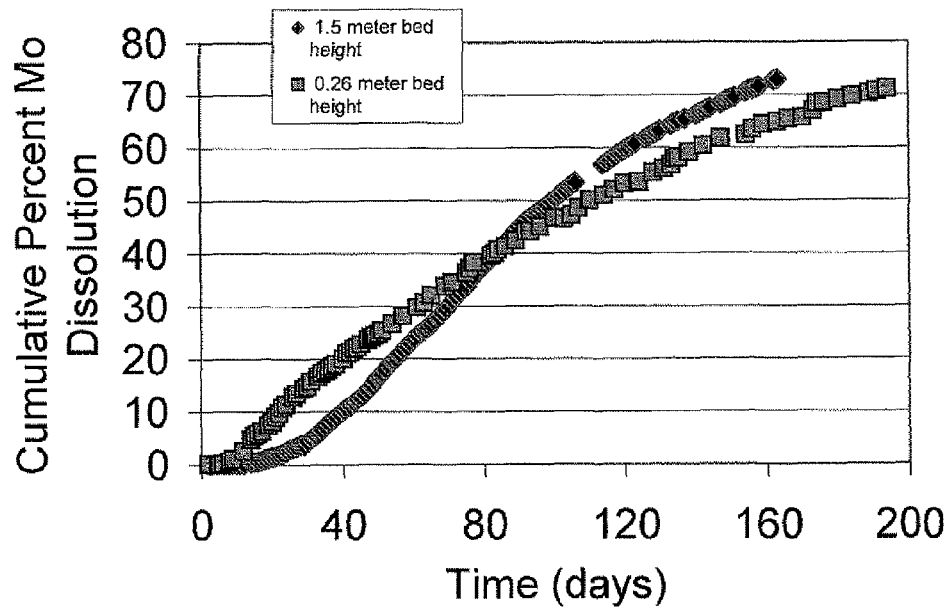

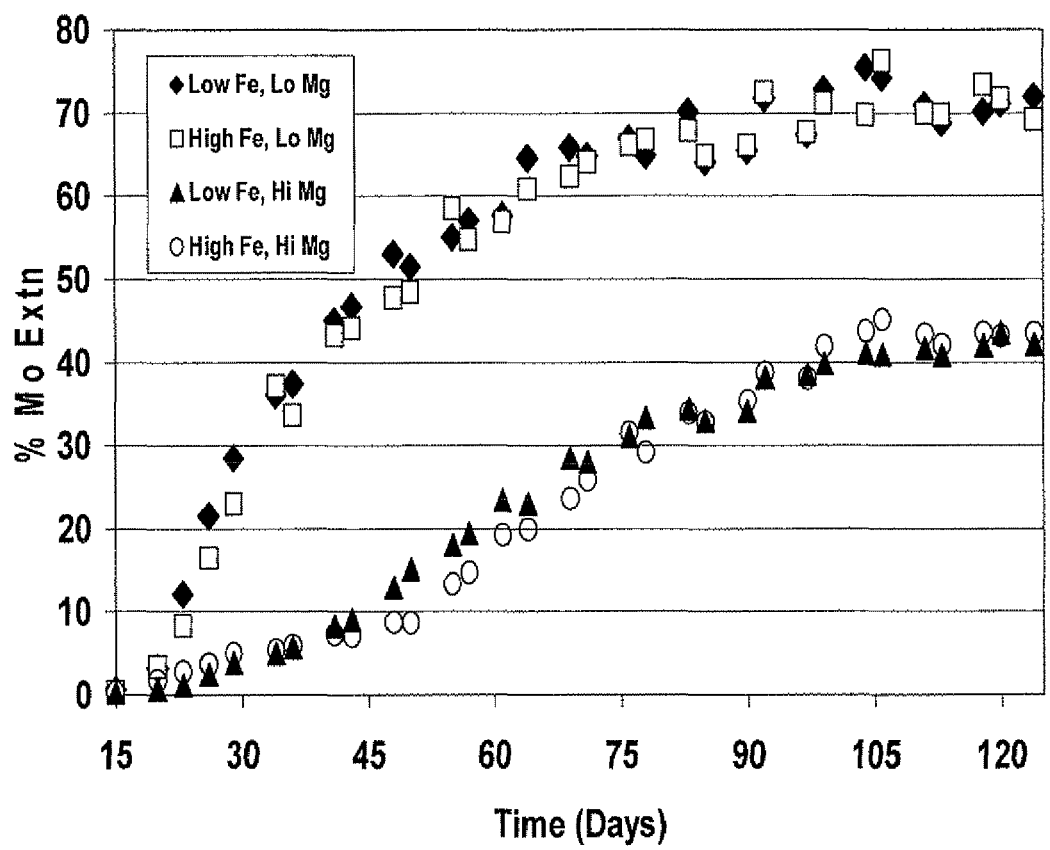
Fig. 18 High Mg Concentrations Inhibit Mo Bioleaching

Fig. 21 Adaptation Process for Mixed Populations of Mesophilic and
Acidophilic Fe – and S - Oxidizing Microbial Populations:
Control of Solution Chemistry and Selective Genetic Pressure
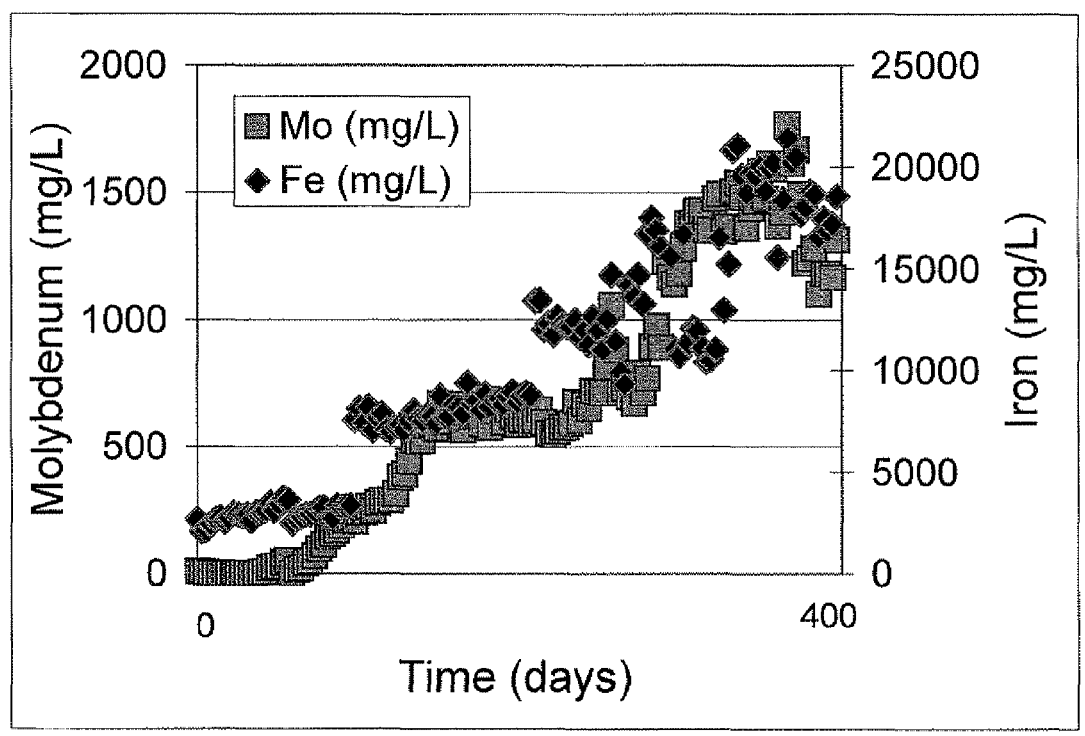

RECOVERY OF MOLYBDENUM FROM MOLYBDENUM BEARING SULFIDE MATERIALS BY BIOLEACHING IN THE PRESENCE OF IRON

CROSS-REFERENCE TO RELATED APPLICATIONS

Related Applications

This application is a national stage application (under 35 U.S.C. §371) of PCT/EP2007/057455, filed Jul. 19, 2007, which claims benefit of U.S. Provisional application 60/834,964, filed Aug. 2, 2006.

FIELD OF THE INVENTION

The invention relates to a method of recovering molybdenum from a molybdenum bearing sulfide material. The material is contacted with a leaching solution in the presence of iron compounds and acidophilic iron-oxidizing microorganisms and subsequently, a leaching process is performed by controlling the molar ratio of dissolved ferric iron to dissolved molybdenum, Preferably, a high concentration and molar excess of dissolved iron is used. Finally, molybdenum is recovered from a leach residue solution of the leaching process.

BACKGROUND OF THE INVENTION

Global industrial demand for molybdenum is high, especially with regard to metallurgical applications. Steels, cast irons, superalloys and welding alloys are important molybdenum-containing end products exhibiting enhanced strength, toughness, wear and corrosion resistance. Important non-metallurgical applications include uses as lubricants and catalysts in petroleum refining processes, paint and dye pigments, and chemical usage in flame retardants and smoke suppressants.

Molybdenite ($MoS_2$) is the primary mineral source of molybdenum. Molybdenite containing ore can be extracted from primary mines for molybdenite. The chief ore is widely distributed, frequently occurring in small veins or scattered as small flakes, and is often associated to with granites, pegmatities or copper sulfides. Therefore, molybdenite is also frequently a by-product in copper mining. Following grinding and flotation operations, copper sulfides give rise to concentrates which are again mechanically processed to obtain molybdenite flotation concentrates. Up to 50% of molybdenite may be lost due to numerous grinding and flotation steps. The molybdenum content in these concentrates is about 45%. This low yield is particularly unsatisfying with regard to the current demand. Further, processing such concentrates by conventional pyrometallurgical technologies has an unfavorable environmental pollution impact and high energy costs.

One family of technologies that has been under development and, in some cases, commercialized, is the integration of biologically based processes to the recovery of metals from low grade ores or high grade concentrates. Two terms are used to describe distinct yet related processes: biooxidation and bioleaching. Both terms refer to the microbially-assisted degradation of sulfide-based minerals. It is a biochemical process which involves a complex interaction between microorganisms, leach solution and mineral surface. Biooxidation is typically used to describe microbially augmented oxidation of minerals such as pyrite ($FeS_2$) and arsenopyrite (FeAsS). Typically, the goal is not to recover iron or arsenic from the sulfides, but to degrade and remove these minerals as they contain refractory precious metals such as gold locked inside. Biooxidation of pyrite and arsenopyrite in refractory gold ores has been applied on a commercial scale using both large heaps of low grade ore and in stirred reactors for concentrates. Following this biological pretreatment, gold is recovered using conventional leaching processes. Conversely, bioleaching refers to the same basic microbiological process, but with the alternative goal of recovering the solubilized metals comprising the sulfide mineral. Hence, in the special case of cobaltous pyrite, bioleaching was applied on a commercial scale to recover cobalt disseminated within the pyrite crystal matrix. Bioleaching is currently used in many places in the world on a commercial scale to recover copper from copper minerals such a chalcocite ($Cu_2S$) and covellite (CuS). Bioleaching has also been commercially applied to ores of uranium, with processes for nickel and zinc sulfides currently at pilot scale.

Metal sulfides were once thought to be degraded by concurrent reactions which were either non-biologically mediated, such as oxidation of the sulfide by Fe(III), or by enzymatically mediated attacks on the crystal structure of the sulfide. These were collectively referred to in the microbiology literature as the "indirect" and "direct" mechanisms, respectively. Recently, features of these classical descriptions have been refined and melded (Schippers and Sand (1999) Appl. Environ. Microb. 65, 319-321) and two distinct mineral specific indirect mechanisms proposed: 1) the thiosulfate mechanism (for example, pertaining to $FeS_2$, $MoS_2$, and $WS_2$) and 2) the polysulfide mechanism (for example, for ZnS, $CuFeS_2$, and PbS). In the context of this work, the function of iron(III) hexahydrate ions is to chemically attack the acid-insoluble metal sulfides pyrite and molybdenite and to further oxidize the generated thiosulfate to sulfuric acid. Efficiency of the process is probably greatly enhanced by extracellular polymeric material produced by the cells which aids in attachment of the cells to the surface of the mineral and complexing and concentrating of Fe(III) at the mineral/cell interface. Several leaching strategies may be employed simultaneously by a mixed population.

Substantial progress has been made in identifying the various microbial populations capable of contributing to metal sulfide degradation in biooxidation or bioleaching processes. Collectively, these populations are referred to as extremophiles, as their normal environment can be characterized as a metal laden dilute sulfuric acid solution. Bacteria typifying a mesophilic temperature regime (20° C.-42° C.) include among others *Acidithiobacillus ferrooxidans*, *A. thiooxidans*, and *Leptospirillum ferrooxidans*. A taxonomically separate group, the Archaea, may be represented by one or more species of *Ferroplasma*, such as *F. acidiphilum*. Moderate thermophiles, for example, *Acidithiobacillus caldus*, *Sulfobacillus acidophilus*, *S. thermosulfidooxidans* and *Acidimicrobium ferrooxidans*, may attain dominance as the temperature increases further to approximately 55° C. Leaching environments attaining temperatures upwards of 65° C. or somewhat higher may be dominated by extreme thermophiles which include additional members of Archaea such as *Acidianus brierleyi*, *Metallosphaera sedula*, and *Sulfolobus metallicus*.

Because metal sulfide oxidation has an electrochemical component, the solution oxidation-reduction potential, or redox potential, is important in bioleaching systems. While more precise technical arguments would include consideration of the mixed (corrosion) potential of the sulfide mineral during microbially augmented oxidation, monitoring solution redox potential is a more convenient and practical operational indicator. The redox potential is governed largely by the molar ratio of Fe(III) to Fe(II) in solution and can be expressed through the Nernst equation and be easily measured in the field or lab by a probe. A high redox potential requires that most of the iron in solution be present as Fe(III), with the primary ion actually being Fe(III) hexahydrate. In both mechanisms, the microbial populations serve to control the redox potential by cyclically oxidizing ferrous iron back to ferric iron as it is consumed by reaction with the sulfide mineral. However, not all iron-oxidizing species found in similar environments are capable of generating extremely high redox potentials since they are inhibited at high concentrations of Fe(III). For example, it is known that an iron-oxidizer such as *Leptospirillum ferrooxidans* can thrive at much higher potentials than *Acidithiobacillus ferrooxidans*.

Some metal sulfides, including chalcopyrite ($CuFeS_2$) and molybdenite, resist microbial bacterial attack to varying degrees and, to date, molybdenite has been considered particularly recalcitrant. First, it was observed that molybdenite leaching kinetics were unfavorable. The reported slow biooxidation rate of molybdenite suggested at least that fine particle sizes and consequent high surface areas may have been required for reasonable biooxidation rates. In addition to its crystalline structure and peculiar electronic configuration, it was noted that the solubility product for molybdenite was found to be highly predictive of its recalcitrant leaching behavior. Notwithstanding these considerations, the observed recalcitrance also appeared to result in part from limitations imposed by the requirement for a very high redox potential or, in other words, high microbial iron-oxidizing activity in the presence of toxic molybdate ions. This has been difficult to achieved during bioleaching, as concluded by Romano et al. (2001) FEMS Microbiology Letters 196, 71-75. In contrast to other problematic sulfides, such as chalcopyrite, to which tremendous efforts have been applied, there has been little additional work over the past nearly 50 years to develop approaches to bioleach molybdenite. Leaching of commercial material under naturally occurring conditions has, prior to the current invention, been considered impractical.

Tributsch and Bennett (1981) J. Chem. Technol. Biotechnol. 31, 565-577, discussed the extreme resistance of molybdenite to bacterial attack and chemical oxidation. They showed molybdenite is not attacked by protons but is attacked oxidatively by ferric ions, albeit very slowly. Molybdenite alone was not a suitable energy source for bacteria, but it slowly reduced $Fe^{3+}$ added to cultures of *T. ferrooxidans* containing molybdenite, resulting in an increase in microbial growth via $Fe^{2+}$ oxidation.

Attempts to address the issue of molybdate toxicity to ore leaching microbial populations have been reported in the literature. An adaptation study was carried out by Duncan et al. (1967) AIME Transactions 238, 122-128. The mesophilic leaching bacterium *Thiobacillus ferrooxidans* (now *Acidithiobacillus ferrooxidans*) slowly adapted over a series of six transfers with the result of growing, albeit at a slower rate, in 90 ppm molybdenum.

More recently, Nasernejad et al. (2000) Process Biochemistry 35, 437-440, used a similar strategy, in this case fifteen sequential transfers from 1 ppm ammonium molybdate to a final concentration of 15 ppm ammonium molybdate. Molybdenum sulfide was oxidized by the microorganism *T. ferrooxidans* in a leach solution comprised of 0.9K mineral salts solution containing 0.9 g/l Fe as ferrous sulfate. Although the final yield was about 93%0, the process involved several washing steps with hydrochloride acid and carbon disulfide, respectively, and a weekly exchange of leaching medium to reduce microbial inhibition, corresponding to a maximum concentration of about 800 mg/l Mo.

Brierley and Murr (1973) Science 179, 488-490, described the use of a thermophilic microorganism at a temperature of 60° C. for bioleaching. The organism, now known as *Acidianus brierleyi*, demonstrated a higher resistance to Mo compared to mesophiles, growing at a dissolved Mo concentration of up to 750 mg/l. Respiration in the absence of growth occurred up to 2000 mg/l of Mo (Brierley, 1973, J. Less Common Metals 36, 237-247). Nevertheless, molybdenum was only solubilized for a yield of 3.3% over a 30-day period. A supplement of 0.02% yeast extract and 1% ferrous sulfate increased the yield to 13.3%, but it remained undetermined whether the ferrous iron may have afforded any protective properties beyond its contribution to indirect leaching.

It has already been known from the prior disclosure of Bryner and Anderson (1957) Ind. Eng. Chem. 49, 1721-1724, that the amount of formed soluble molybdenum was increased when pyrite and molybdenite were bioleached together, thereby indicating an effect of soluble iron on the increased biological oxidation of molybdenite. However, the authors determined a definite optimum ferrous iron concentration at 4.000 ppm which yielded a total of 140 mg of soluble molybdenum concentration extracted from 5 g of molybdenite concentrate. Furthermore, it was shown that the amount of leaching was proportional to the particle size. Neither the yield nor the tolerance to molybdenum are enhanced to economic levels by considering the consistent results of the above documents.

Karavaiko et al. (1989) in Salley et al. (eds.) Proc. Int. Symp. CANMET SP 89-10, 461-473, described the saturation limit of dissolved Fe and Mo in iron containing (9K) medium during *T. ferrooxidans* growth and ferrous iron oxidation. Molybdenum and ferric iron occurred in both the liquid phase and in precipitates depending on their concentrations and the amount of inoculum. Sedimentation of Mo(VI) was virtually absent at pH 2.4-2.5 if its initial concentration did not exceed 250 mg/l, whereas ferric iron started to sediment in the presence of 750 mg/l Mo(VI). The solubility restrictions resulted in an effective concentration of 2443 mg/l ferric iron when a 30% inoculum was added to the culture medium, resulting in a tolerance of the organisms to 500 mg/l Mo(VI). A 20% inoculum corresponded to addition of 1675 mg/l ferric iron and 150 mg/l Mo(VI) was tolerated. Even though the authors acknowledged a contribution of ferric iron to increased *T. ferrooxidans* resistance due to chelating and partially sedimenting Mo(VI), the important protective role was assigned to amino acids forming composite iron-molybdenum complexes. Adaptation of *T. ferrooxidans* to Mo and other heavy metals was attributed to selection of mutants with increased synthesis of chelating exometabolites (amino acids). The authors suggested that a decrease in toxicity by chelation or precipitation could depend on media composition.

Use of leach solution chemistry to control toxicity of ions leached from ore has corollaries in other bioleaching applications. For example, Sundkvist, Sandström, Gunneriusson and Lindström (2005) Proc. 16th International Biohydrometallurgy Symposium, D. E. Rawlings and J. Petersen (eds.), 19-28, demonstrated that fluoride toxicity to bioleaching microorganisms could be minimized by the addition of aluminum to the leach solution.

PRESENT INVENTION AND EMBODIMENTS

All prior art approaches have failed to provide an adequate solution for efficiently recovering molybdenum from solid feedstocks using microbially augmented processes. The current invention described herein allows application of a bioleaching approach to efficiently and economically process molybdenite and/or related molybdenum-bearing sulfide materials for the recovery of molybdenum, with said process allowing processing of low to high grade feedstocks with improved efficacy in terms of rate and yield.

The present invention addresses this object according to claim 1. The additional claims comprise preferred embodiments. The present invention provides a method for recovering molybdenum from a molybdenum bearing sulfide material which is comprised of the following steps:
(a) contacting the molybdenum sulfide feed material with an acidic leach solution in the presence of at least one iron compound and acidophilic microorganisms being at least capable of oxidizing ferrous iron,
(b) performing a leaching process by controlling the molar ratio of dissolved ferric iron to dissolved molybdenum, and
(c) recovering molybdenum from solid and/or liquid residues of the leaching process.

The basis for the leaching process is controlling the molar ratio of dissolved ferric iron to dissolved molybdenum. By adjusting the absolute amount of ferric iron and, accordingly, its amount relative to dissolved molybdenum, ferric iron modulates toxicity and protects the microorganisms in the leaching process. Lethal effects of hexavalent molybdenum to the ore leaching bacteria are abolished up to concentrations of 4.4 g/l molybdenum. Organic metabolites (i.e., amino acids) are not required for protection of cells from Mo toxicity as reagent ferric sulfate added to culture solutions allowed for microbial growth and iron oxidation at high dissolved Mo concentrations. It is to be understood that the leaching proceeds under conditions which enable iron and molybdenum to remain dissolved, even at high concentrations. Such high amounts of ferric iron can be obtained by the activity of acidophilic iron-oxidizing microorganisms. While iron is not necessarily recovered during the process, the term bioleaching may be properly applied to molybdenite or pyrite oxidation in the case of the current invention since iron is used in the process not only as a chemical oxidant and, when re-oxidized, to maintain a high solution redox potential required for efficacious leaching, but the oxidant itself also has the central role of complexing molybdate and minimizing toxicity to the microbial populations.

For a start, a material comprising a molybdenum bearing sulfide is provided. As used herein, including the appended claims, singular forms of words, such as "a," "an," and "the", include their corresponding plural referents, unless the context clearly dictates otherwise. Thus, e.g., reference to "a molybdenum bearing sulfide" includes one sulfide or a mix of sulfides.

The material may originate from, though not be limited to, ores, minerals, catalysts and wastes. The material can be subjected unaltered to the method of the invention or be subjected to one or more pre-treatment steps prior to further processing. For example, suitable methods of pre-treatment known to those skilled in the art may include drying, grinding, slurring and/or bioleaching. A grinding pre-treatment is recommended to define the average particle size which affects several process parameters, including agglomeration, microbial attachment, surface area (directly affecting bioleaching rate), permeability to gases and leach solution, etc. However, the molybdenum containing sulfide material can be applied to the process within a fixed bed or slurry depending primarily on the desired reactor configuration. Solid material is preferred in a natural heap or dump environment, whereas a slurry facilitates handling in stirred reactors.

Within the context of this invention, ore material often represents a blend of minerals comprising, but not limited to, molybdenite, pyrite, chalcopyrite and/or bornite, for example. A pre-leaching step can be required to reduce the content of copper sulfides in particular and to lessen competition for ferric irons in the leach solution by the copper and molybdenum sulfides, thereby allowing the maintenance of a high solution redox potential.

The leach solution is herein defined as an acidic ferric sulfate solution amended with nutrients promoting cell growth, especially the proliferation of iron-oxidizing acidophilic microorganisms, whether attached to solid feedstock materials or in free suspension. For example, such a leach solution would contain nutrients in the form of, but not limited to, ammonium sulfate, magnesium sulfate heptahydrate and potassium dihydrogen phosphate in appropriate concentrations.

Chemolithotrophic microorganisms are able to utilize inorganic electron donors as energy sources. In the present invention, such energy sources for microbial populations would include sulfide minerals not limited to pyrite, molybdenite and chalcopyrite or related materials in addition to elemental sulfur, sulfur species of intermediate oxidation state, and by autocatalytic recycling of $Fe(II)$ to $Fe(III)$ in solution. Adequate aeration is required as oxygen is the preferred terminal electron acceptor for enzymatic biooxidation of iron and sulfur compounds and carbon dioxide is fixed by the microorganisms as their main source of carbon for growth. Ferrous sulfide and/or ferrous sulfate are preferred iron compounds. Ferrous iron can be supplemented to the leach solution. Alternatively, ferrous sulfate can be formed in the course of ferrous sulfide oxidation or due to the reaction of ferric iron with another metal sulfide. Microbial oxidation of the resulting ferrous iron in solution regenerates ferric iron, these ferric iron compounds being an iron compound of the invention. The bacteria regenerate the oxidizing agent for the other metal sulfide by means of oxidizing ferrous iron to ferric iron either via thiosulfate or polysulfide which depends on the particular metal sulfides present. In the meaning of the invention, the other metal sulfide is preferably molybdenite for which leaching proceeds by the indirect mechanism via thiosulfate. Therefore, the presence of iron compounds in the solution is based on the requirement of iron-oxidizing species for indirect leaching. In addition, the inventor has demonstrated the unexpected benefit of ferric iron to mediate the protection of iron-oxidizing bacteria if applied according to the invention.

The iron-oxidizing microorganisms are extremophiles which are capable of tolerating low pH values. Various acidophilic, iron-oxidizing microorganisms are available for the oxidation of mineral sulfides. Favorably, the leaching solution is inoculated with a mixed culture, but some of the basic operating conditions will eventually limit the equal growth and lead to the domination by a single or more particular strains.

The leaching process of step (b) is performed in a reaction volume which can be either composed of an open, outdoor environment, such as a heap, dump or mine, or an artificial reactor, such as stirred tank reactor, vat or column. The molybdenum bearing sulfide can be leached in an apparatus which is open to atmosphere or substantially closed. Common leaching techniques are known in the art and are not further described herein. The following specifications are focused on the process parameters underlying molybdenite bioleaching. "Leaching" or "bioleaching" are used interchangeably herein and refer to the use of different types of microorganisms to dissolve valuable metals from mineral sulfides via direct and/or indirect mechanisms. In the meaning of the invention, the valuable metal is molybdenum. Molybdenum sulfide is leached by the reaction with ferric iron, whereby molybdate and ferrous iron are produced. It is the microbial contribution to reoxidize the ferrous iron in the processing circuit. However, it is not to be excluded that the mixed culture comprises microorganisms which are capable of oxidizing molybdenite in a direct fashion.

The molar ratio of dissolved ferric iron to dissolved molybdenum represents the set point for process control. Process control includes a permanent, periodically or aperiodically adaptation of said molar ratio in which a molar excess of dissolved ferric iron is applied or maintained by microbial iron oxidation. A high excess of ferric iron completely eliminates any toxic effects caused by molybdate. Both components have to be present as chemical species in solution for molybdenum to be accessible for recovering in the following step (c) and for ferric iron to act as complex forming agent.

The molar ratio can be altered via the concentrations of dissolved ferric iron and/or dissolved molybdenum. Preferably, a high concentration of ferric iron is set in the method of the present invention. It can be obtained by providing a high initial concentration of ferric iron in the material and solution, respectively, and/or by providing any other iron from which the ferric iron is formed later. The essential concentration of iron can be estimated, especially with regard to previous empirical process data or pre-determined criteria, such as a known molybdenite content and leaching yield. This can also be referred to as aperiodical controlling. Although the addition of iron may be based on the expected demand, it is preferred to make use of suitable direct measurements of molybdenum and ferric iron concentrations during operation to determine the actual values of the critical molar ratio. The skilled artisan is familiar with suitable analytical techniques which are applied either continuously or periodically. The ratio is calculated by dividing the ferric iron molar concentration by the molybdenum molar concentration. Favorably, the process is performed while maintaining a threshold ratio. Various techniques may be used for controlling the molar ratio and hence for controlling the supply of iron and/or molybdenum sulfide to the slurry at desired values. A preferred approach to the control aspect is to utilize one or more analytical approaches known to those skilled in the art as probes to measure directly concentrations and the molar ratio, respectively, in the leaching slurry contained within a stirred reactor system. Probes may be employed to indirectly measure microbial activity through solution redox potential. The probes may produce one or more control signals which are used to control the operation of a suitable valve or valves automatically so that the supply of iron, as ferrous sulfide, ferrous sulfate or related compounds, or molybdenum, as a molybdenum sulfide bearing material is added to a process feedstream automatically in accordance with real time measurements of the ratio in the slurry. The invention is not limited to the actual control technique employed and is intended to extend to variations of the foregoing approaches and to any equivalent process.

Advantageously, a concentration of up to 4.4 g/l dissolved molybdenum is non-inhibitory to the ore leaching microorganisms. It is important to consider that the dissolved molybdenum does not exceed the maximal threshold to be tolerated. In case of approaching the threshold, the molybdenum concentration has to be reduced, for example by means of exchanging the leaching solution, diluting the slurry, removing molybdenum and/or lowering the rate of continuous supply of the molybdenum bearing sulfide.

In the final step (c) molybdenum is recovered from solution by any appropriate process, for example solvent extraction followed by electrowinning, precipitation or by resin-in-pulp applied to the slurry followed by electrowinning.

In an embodiment of the present invention, the starting material is preferably provided as a molybdenum bearing sulfide mineral, with molybdenite ($MoS_2$) being the chief ore of molybdenum. Molybdenite extracted from primary mines for that mineral, or recovered either as a by-product of copper ore processing metallurgy or as spent metal-centered catalysts are possible sources of the molybdenite mineral in the inventive method. High-grade is molybdenite concentrates, low-grade concentrates, including those containing additional metal sulfides, tailings or other wastes which may result from mechanically processing, such as grinding and flotation steps, are well suited. The concentrates and tailings can also be pre-treated, such as by drying, grinding, slurring and/or bioleaching.

At least a single type of iron compound is initially present in the solution, additional iron compounds having the same or different iron oxidation states are possible as well. In another embodiment of the invention, the iron compounds comprise ferrous iron or ferric iron. Preferably, the ferrous iron is supplied as insoluble ferrous iron bearing sulfide and/or represents ferrous ions being originally part of soluble ferrous compounds. Similarly, the ferric iron preferably represents ferric ions being originally part of soluble ferric compounds or iron-bearing metal sulfides. Both, the ferrous and the ferric compounds are iron compounds of the invention which dissociate in aqueous solutions, preferably completely. Such strong electrolytes are sulfate salts, for example. It is preferred to provide the iron compound as ferrous sulfate or ferric sulfate.

A minimum concentration of iron, denoting ferrous iron and ferric iron herein, has been fixed to perform the diverse tasks in the inventive method. The minimum concentration is initially given and should also be maintained during the process. The formation of iron-molybdate complexes can reduce the available iron content and require the addition of supplemental soluble iron or iron-bearing mineral feed to the leach solution. Due to the possibility of converting ferrous iron to ferric iron and vice versa, it is sufficient to set a total concentration which should amount to at least 0.5 g/l of the aforementioned iron species. The amount of 0.5 g/l iron (8.95 mM iron) can be supplied by 1.79 g/l ferric sulfate, for instance. The total iron concentration can be raised until the limit of solubility is reached which is determined by the chemical environment of the slurry. The slurry comprises the molybdenum bearing sulfide material and the leaching solution which are contacted in a suitable reaction volume.

In another preferred embodiment of the invention, ferric iron is used at a concentration of 0.5 g/l to 40 g/l, preferably 2.5 g/l to 21.5 g/l, or more preferably 5 g/l to 20 g/l ferric iron. Such a concentration range of ferric iron is optimal for molybdenum bioleaching assuming that the solution redox potential is also high. However, the threshold concentration is expected to vary with the rate of iron consumption, or the concentration of molybdenum in solution. This will be affected by molybdenite loading and the presence of other sulfide minerals.

The content of ferrous iron bearing sulfide minerals has to be determined by methods known to those skilled in the art if it is not intended to add an iron compound to the leaching solution. An appropriate method is the XRD/XRF analysis, for example. The appearance of low pyrite contents which are eventually supplied with the molybdenum bearing sulfide mineral needs an ex post feeding of iron prior to the leaching process of step (b).

Clearly, the microorganisms which are used for molybdenum bioleaching are determined by the operating temperature. The microorganisms are preferably a mixed culture of mesophiles, moderate thermophiles and/or extreme thermophiles which are obtained from acidic waters originating, but not limited to, metal sulfide mining operations through heap-bioleaching, acidic runoff originating from sulfidic waste rock, or naturally occurring acid-rock drainage, or obtained from culture collections. The microbial culture is grown and maintained by known techniques to the skilled artisan, such as in shaken and aerated vessels of acidified mineral salts solution.

In a preferred embodiment of the invention, the method comprises the step of pre-culturing the microorganisms in a medium comprised of mineral salts and ferrous iron prior to step (a), that is cell growth and onset of active iron oxidation, as measured by those skilled in the art, occurring prior to contact and subsequent growth in the presence of a molybdenum sulfide bearing material. The culture medium may be identical to the leaching solution. This procedure is especially useful in adapting the cells, stimulating exponential growth and generating a ferric iron concentration which is optimal for molybdenite bioleaching and simultaneously complexing molybdate.

Herein, suitable mesophilic bacteria are selected from, but not limited to, the genera *Leptospirillum, Ferroplasma, Acidithiobacillus*, and *Ferrimicrobium*. Preferably, a mesophile from the genus *Leptospirillum* is used, more preferably the species *Leptospirillurn ferrooxidans* or *L. ferriphilum*. Moderately thermophilic bacteria for use in the present invention are selected from the genera *Acidithiobacillus, Acidimicrobium, Sulfobacillus*, and *Alicyclobacillus*. Extremely thermophilic bacteria are selected from the genera *Sulfolobus, Metallosphaera*, and *Acidianus*.

The bioleaching may be carried out at temperatures of up to 100° C. Any suitable microorganism capable of oxidizing iron within this temperature range can be used. The optimum operating temperature is dependent on the genus and type of microorganism and vice versa. Mesophilic microorganisms grow best in a temperature range of 20° C. to 42° C., moderate thermophilic microorganisms prefer 42° to 60° C. and extremely thermophilic microorganisms are cultured above 60° C. However, all microorganisms can adapt to temperatures somewhat lower than their optimum, although this may be reflected by reduced growth rates and leaching rates.

The inventive method is preferably carried out at a temperature which lies in a range of 20° C. to 65° C. The bioleaching rate of molybdenite increases with temperature up to a threshold as extreme thermophiles do not increase the rate of molybdenite bioleaching above that achieved within lower temperature regimes. In a preferred embodiment of the invention the molybdenite bioleaching phase is carried out within a mesophilic temperature range of 20° C. to 42° C. A process for the biooxidation of molybdenum bearing sulfide materials should target the upper end of the mesophilic temperature range, preferably at a temperature of 30° C. to 42° C., more preferably at 40° C. In order to operate the process at a temperature below 42° C., the microbial populations are selected from among the mesophiles, preferably among the aforementioned genera. In another preferred embodiment of the invention the molybdenite bioleaching phase is carried out within a moderately thermophilic temperature range of 42° C. to 60° C. If the bioleaching step is carried out at a temperature of 42° C. to 60° C., then moderately thermophilic microorganisms are used as selected among the aforementioned genera. In still another preferred embodiment, any pre-treatment that involves bioleaching of metal sulfides other than molybdenum sulfide, especially chalcopyrite, but represented as part of an admixture of sulfides including molybdenum sulfide is carried out at high temperature, preferably at high temperature within the range of 42° C. to 65° C., more preferably at 65° C., with appropriate microbial populations chosen from the aforementioned genera.

In carrying out the method of the invention the slurry temperature in the bioleach apparatus, such as a vessel or reactor, may be controlled in any suitable way known in the art, such as reactor type, dimensioning, heating, insulation and cooling system. In one example the bioleach reactor is insulated and heating takes place by means of energy which is released by the oxidation of sulfides. The temperature of the slurry is regulated using any suitable cooling system, for example an internal cooling system, as is typically used by those skilled in the art.

In still another preferred embodiment of the present invention, in step (b) the molar ratio of ferric iron to molybdenum is controlled to be at least 6:1, preferably at least 7:1, more preferably at least 8.4:1, most preferably at least 20:1. Surprisingly, it appears that as long as dissolved ferric iron is present above a certain threshold concentration, its absolute concentration is not critical to bioleaching of molybdenum bearing sulfides. The threshold is determined by the molar ratio of dissolved iron to molybdenum. Column tests demonstrated a requirement for a higher ferric iron to molybdenum ratio than in shake flasks to prevent molybdate toxicity to microorganisms and to allow bioleaching of molybdenite. This difference probably reflects the much higher solids to solution ratio in columns compared to shake flasks. The column may be more relevant to a process situation where molybdenite is bioleached in a heap.

The process of step (b) is preferably performed at pH 2.0 or less. Especially, the pH value lies in the range of 1.2 to 2.0, more preferably 1.4 to 1.6. As stated previously herein the chemolithotrophic microorganisms are acidophilic so that a low pH value is intrinsically required. For example, a pH optimum of about 2.5 is described for *A. ferrooxidans* in the prior art. It has been unexpectedly demonstrated by the inventor that a further decrease of pH is of particular benefit in maintaining high soluble ferric iron and molybdenum concentrations according to the invention. Furthermore, low solution pH is correlated with the maintenance of a high redox potential of at least 700 mV (standard hydrogen electrode).

In another preferred embodiment of the present invention, the leaching process is performed at a redox potential of at least 750 mV, more preferably at least 800 mV, most preferably at least 900 mV. A high solution redox potential is required for molybdenite oxidation and the higher this potential is relative to the rest potential of molybdenum sulfide, the better the oxidation takes place in terms of rate and yield. The ferric iron to ferrous iron ratio is of primary importance in fixing the potential in a bioleach solution. This ratio and the solution potential are directly correlated though the Nernst equation. Herein, microorganisms are used that are capable of achieving the necessary redox potential by their iron-oxidizing activity. Certain microorganisms are better able than others to oxidize ferrous iron to ferric iron at high solution redox potential.

It shall be understood that optimal growth conditions for the leaching microorganisms also maintain the redox potential. These conditions include sufficient nutrient supply, aeration, dissolved ferric iron and a low pH. It is also possible to feed single compounds, such as an iron compound for acting in the meaning of the invention and/or sulfuric acid for pH maintenance. Various techniques are known to those skilled in the art to feed nutrient streams or selected compounds, either automatically or manually.

In addition to maximizing microbial iron-oxidizing activity, other means are also available for supporting the maintenance of such a high redox potential: pH control and minimizing the rate of consumption of ferric iron by metal sulfides other than molybdenum sulfide. For example, ferric iron precipitation is greatly lessened at solution pH values below 2.0. Minimizing selective precipitation of ferric iron maximizes the ratio of ferric to ferrous iron in solution, thereby maximizing solution redox potential. Further, metal sulfide minerals having a lower rest potential in comparison to molybdenite can be removed by an appropriate biological, chemical or other pre-treatment to prevent competition for ferric iron oxidant. Therefore, molybdenum sulfide bearing material agglomerated with material containing one or more metal sulfides other than molybdenum sulfide is pretreated to minimize non-molybdenum metal sulfide content prior to the onset of the active molybdenum sulfide leaching phase.

The preferred starting material bearing molybdenite has a particle size of less than 50 µm, preferably less than 15 µm. The particle size exerts an influence on the course of leaching via permeability, agglomeration, microbial attachment, specific surface and the like. Preferably, the mineral is provided with a specific surface area of at least 3 $m^2/g$, more preferably at least 10 $m^2/g$. There is a clear correlation between particle size and biooxidation rate of molybdenites. The initial molybdenite bioleaching rate corresponding to the first 20% of extracted molybdate increases with decreasing particle size. Similarly, the maximum extent of molybdate extraction depends on the particle size. Particles of a defined average size are obtained by mechanical processing such as grinding.

The molar ratio and/or pH are preferably monitored periodically by analytical means or by on-line continuous data acquisition. Analytical operations comprising the measurement of concentrations, redox potential and pH are routine procedures known to those skilled in the art. Either the molar ratio is monitored directly or indirectly. The molar ratio is indirectly monitored by determining the concentrations of dissolved ferric iron and dissolved molybdenum, and correlating them. The concentrations are preferably determined by ICP spectroscopy.

There are several possible routes for supplying iron. Possible embodiments of the current invention could include, but not be limited to, supplying iron as soluble ferrous or ferric sulfate, as a component of an oxidizable metal sulfide, or from iron scrap. Soluble ferrous iron and ferric iron are favorably obtained from commercial sources. In a preferred embodiment of the invention, the iron compound is provided as ferrous sulfate in the leaching solution since it secondarily provides a ready energy source for iron-oxidizing microbial populations. However, it can also be provided as a ferrous iron bearing sulfide mineral. The dissolution of a large number of iron bearing sulfides has been shown to be microbially assisted. It shall be understood that the microbial populations inherent in the invention or at least a portion thereof are capable of oxidizing iron and/or sulfide which is inevitably required for converting the iron bearing sulfides offered. Although any ferrous iron bearing sulfide is actually suited within the context of the invention, pyrite in particular is preferred. Iron-bearing sulfides are added to the leaching solution as in mineral form, or are those, such as chalcopyrite, which may be inherently associated with molybdenite. The amount and/or particle size of iron bearing sulfides added may be adjusted so as not to depress solution redox potentials below that required for molybdenite bioleaching.

As already described in the course of the present specification, a minimum redox potential of 700 mV is required in the leaching solution or slurry, respectively. A decreasing potential breaking through the aforementioned threshold is a clear indication that an increasing concentration of molybdate has reached a level inhibitory to microbial iron-oxidizing activity, or that some other factor is inhibiting microbial iron oxidation or consuming ferric iron. Hence, any operation has to be carried out to increase the redox potential along with the ratio of ferric iron to molybdenum. In the simplest case, ferric iron is added to the leach solution to achieve a distinct molar excess in comparison to molybdenum. Of course, other iron compounds can be added which are metabolized to ferric iron by the leaching bacteria. The iron compounds can be added as a single iron feeding stream or as part of the complete leaching solution. It is also possible to diminish the current molybdenum concentration by exchanging the leaching solution, diluting the slurry, removing molybdenum and/or lowering the rate of supply of the molybdenum bearing sulfide. The redox measuring system is favorably linked to an automatic control system. The redox threshold can be fixed at a higher redox level exceeding 700 mV to prevent any temporarily reduced metabolic activity and bioleaching rate, or cell damage.

Removal of molybdenum may be performed in the manner described for the recovering step (c). The bioleach solution may be subjected to a separation step to produce solids and solution, and the molybdenum is recovered from the solution in any appropriate way. For example, molybdenum is recovered by using precipitation, ion exchange, solvent extraction and/or an electrowinning process. Preferably, an ion exchange procedure by means of a weak alkaline anion exchanger is applied.

The method of the present invention can be advantageously used for sequential bioleaching. In particular, molybdenite and associated sulfide minerals can be leached sequentially. Whereas available iron sulfide minerals are favorably adjuvants for molybdenite leaching, other heavy metal bearing sulfides may interfere. The latter phenomena is frequently recognized as such sulfides are easily attacked by ore leaching microorganisms, for instance those characterized by a low rest or mixed (corrosion) potential. As an example, higher contents of copper sulfides can dramatically reduce the solution redox potential by consuming ferric iron at a rate in excess of the rate of microbial regeneration. In another embodiment, the method of the invention comprises the step of removing a sulfide bearing a heavy metal sulfide with a rest potential less than 700 mV from the material prior to step (a). The sulfide is selected from the group of bismuthite, enargite, chalcopyrite, bornite, covellite, chalcocite, tetrahedrite, pentlandite, millerite, galena, uranite and sphalerite, preferably chalcopyrite and bornite, more preferably chalcopyrite.

The sulfide is preferably removed by subjecting the material to a pre-leaching process, and removing the heavy metal from a leach residue of the pre-leaching process. With chalcopyrite, the pre-leaching process can be performed at a temperature of 50° C. to 85° C., preferably 60° C. to 80° C., more preferably at 65° C. The heavy metal, such as copper, can be recovered from the pre-leach residue of the pre-leaching process by appropriate methods. According to the elevated temperature range, iron- and sulfur-oxidizing moderate and/or extreme thermophilic microorganisms are used in the pre-leaching process, preferably extreme thermophilic microorganisms. They can be obtained from the mixed culture to be used for molybdenum leaching. The prior teaching of the present specification concerning the mixed culture, origin and composition thereof is considered as valid and applicable without restrictions to the mixed culture for pre-leaching if it is expedient. Suitable extreme thermophiles could include, but not be limited to, representatives selected from the genera *Sulfolobus, Metallosphaera*, and *Acidianus*. Among those, it is especially preferred, though not limited to, the species *Sulfolobus metallicus, Acidianus brierleyi* and *Metallosphaera sedula*.

The method of the invention is of particular benefit to molybdenum bearing sulfide materials which are refractory to leaching. Therefore, the present invention opens the door to commercial leaching of molybdenite which to the applicant's knowledge was previously not possible. The oxidation of molybdenum bearing sulfides is highly specific. High rates of reaction and yields are advantageously achieved by leaching in the presence of ferric iron. The ore leaching microorganisms are efficiently protected from molybdenum toxicity by ferric iron. Other microbial metabolic products, particularly organic compositions, are not required.

The leaching process is simply controlled by the molar ratio of dissolved ferric iron to dissolved molybdenum which is maintained at a sufficient molar excess of ferric iron. The specific sulfide oxidation duty of the process is increased with regard to rate and increased threefold with regard to yield. The molybdenum leaching rates amount to 10% per day in shake flasks and 0.9% per day in column experiments, respectively. The provision of such leaching rates is an essential precondition to establish an implementable process for molybdenum recovery. Furthermore, significantly higher amounts of solubilized molybdenum are obtained as well as kept in solution in comparison to prior art. Concentrations of up to 4.4 g/l dissolved molybdenum enable the simple and economic recovering of the molybdenum in downstream operations.

The method of the invention can be easily realized in a technical process and economically performed. It is demonstrated that molybdenite is solubilized by heap leaching in a such a way being commercially practicable. A significant improvement in space-time yield is recognized. Concentrates or waste streams of molybdenum and copper ore dressing can be favorably used as starting material in the process.

The following examples are provided by way of illustration and not by way of limitation. Within the examples, standard reagents and buffers that are free from contaminating activities (whenever practical) are used.

BRIEF DESCRIPTION OF THE DRAWINGS

FIG. 1 shows the minimum inhibitory concentration of Mo species towards iron-oxidizing bacteria.

FIG. 2 shows the time course of Fe(II) biooxidation in the presence of Mo.

FIG. 3 shows the solution Eh in $MoS_2$-containing flasks containing different amounts of added ferric iron.

FIG. 4 shows the bioleaching of $MoS_2$ with various amounts of added ferric iron.

FIG. 5 shows the relationship between particle size and bioleaching rate of $MoS_2$.

FIG. 6 shows the dissolution of Mo and Cu from a long-term column under mesophilic conditions.

FIG. 7 shows the effect of modifications to leach solution Fe concentration on Mo dissolution, FIG. 8 shows the leach solution oxidation-reduction potential upon modification of Fe concentration of leach solution.

FIG. 9 shows the dissolution of Mo and Cu from a long-term adaptation column under mesophilic conditions.

FIG. 10 shows the manipulation of iron concentrations in leach solution.

FIG. 11 shows the Mo concentrations in leach solution corresponding to manipulations of solution iron concentrations.

FIG. 12 shows the solution oxidation-reduction potentials during manipulation of solution iron concentrations.

FIG. 13 shows the influent and effluent leach solution Fe concentrations.

FIG. 14 shows the effluent pH of leach solution from a 1.5 m bed.

FIG. 15 shows the effluent oxidation-reduction potential from a 1.5 m bed.

FIG. 16 shows the normalized daily rate of Mo solubilization from a 1.5 m bed.

FIG. 17 shows the comparison of Mo dissolution from small and large laboratory columns.

FIG. 18 shows effects of high Fe and high Mg on Mo extraction from reground 3-part composite at 25° C. and 0.6% solids.

FIG. 21 shows how increases in solution iron concentrations result in increased adaptation plateaus of leaching organisms to Mo.

EXAMPLE 1

Figure 19:
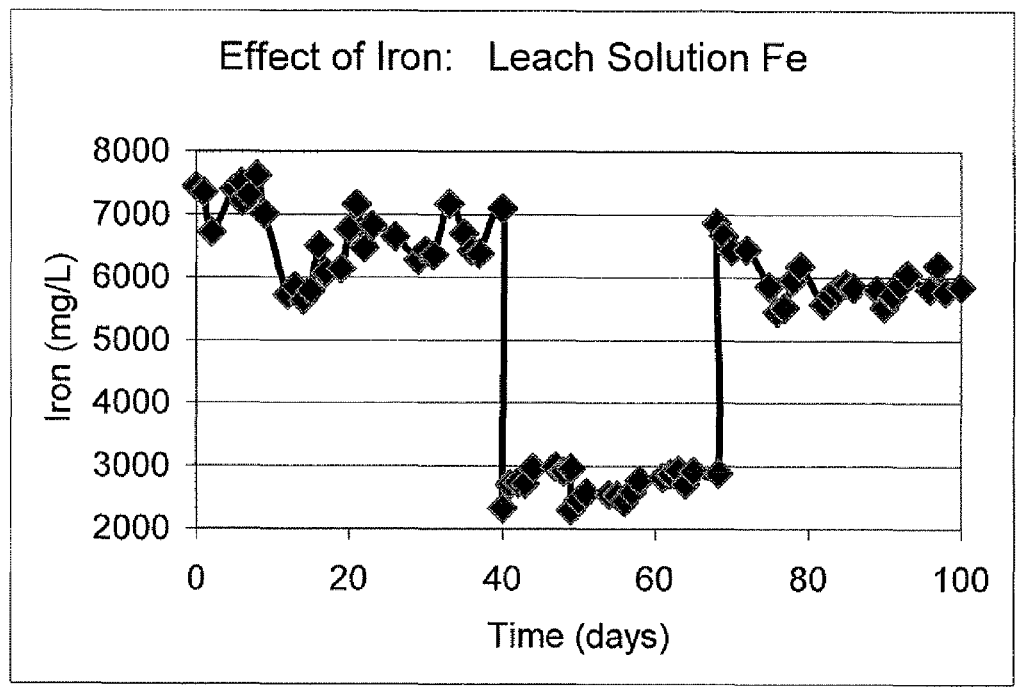
FIG. 19 shows the dissolved iron concentration in a test to determine the effect of solution iron on Mo bioleaching.

This test was done to determine if the toxicity of Mo toward iron-oxidizing microorganisms varied among different chemical species of Mo.

An active culture of iron-oxidizing microorganisms was inoculated (5 mL) into 45 mL of fresh 2×MKM medium in each of ten 250-mL Erienmeyer flasks. 2×MKM medium contained 0.8 g/L ammonium sulfate, 0.8 g/L magnesium sulfate heptahydrate and 0.08 g/L potassium dihydrogen phosphate. The medium contained 6 g/L of ferrous iron (as ferrous sulfate heptahydrate) as the energy source and was adjusted to pH 1.5 with sulfuric acid. The inoculum was a 5 day old culture of mixed mesophilic iron-oxidizing microorganisms growing in 2×MKM medium containing 0.6 g/L of ferrous iron (as ferrous sulfate heptahydrate). The inoculum culture was started from a shake flask culture of mixed iron-oxidizing mesophiles that were bioleaching molybdenite in 2×MKM plus iron medium.

The ten cultures were incubated at 24° C. with shaking at 180 rpm overnight to allow cells to begin to grow and oxidize iron in the absence of Mo. The next day, about 10% of the iron in the flasks had been biooxidized as indicated by titration with permanganate solution. Various amounts and forms of Mo were added to the actively growing cultures. One flask remained as an untreated control. Mo was added from concentrated stock solutions as sodium molybdate (stock solution contained 48.9 g Mo/L as $MoO_3$ dissolved in 1M NaOH, then neutralized with sulfuric acid), silicomolybdate ($H_4SiO_4 \cdot 12MoO_3 \cdot xH_2O$), or phosphomolybdate ($12MoO_3 \cdot H_3PO_4 \cdot xH_2O$). The sodium molybdate and phosphomolybdate stock solutions were crystal clear. Silicomolybdate stock solution contained a small amount of floc-like precipitate. Nominally, Mo was added at 10, 100, and 1000 mg/L to the flasks. The actual concentration of dissolved Mo was determined by ICP spectroscopy following centrifugation of samples for 5 min at 1200×g.

The pH was maintained at <2.0 by addition of sulfuric acid, if necessary. The Eh of solutions was determined using a combination platinum/silver-silver chloride electrode. Meter readings were corrected to the standard hydrogen electrode (SHE) by addition of 199 mV. The Eh values of the solutions in the flasks were monitored with time until virtually all of the iron was biooxidized in the control flask, which occurred after 3 days. At this point, Fe(II) concentrations were determined in all flasks by titration with permanganate. The % iron biooxidized in the presence of various concentrations of Mo species was compared (FIG. 1).

Results showed no inhibition of microbial Fe oxidation at 8 to 11 mg/L Mo added as Na—Mo or P—Mo. However, over 50% inhibition of Fe oxidation occurred at the lowest concentration of Si—Mo (7.3 mg/L). At 56 to 101 mg/L, all species of Mo were highly inhibitory (FIG. 1). After an additional 4 days of incubation, results were unchanged. The complex Mo species (P—Mo, Si—Mo) were as inhibitory as Na molybdate.

EXAMPLE 2

This test showed that addition of ferric ions to culture media permits biooxidation of iron at elevated Mo concentrations.

One set of 4 flasks ("L" flasks) contained 2×MKM culture medium with 2 g/L Fe(II) (as ferrous sulfate heptahydrate). A second set of flasks ("H" flasks) contained the same basal medium but with a higher concentration (6 g/L) of Fe(II). The eight flasks were inoculated with 5 mL of the iron-oxidizing microbial culture containing 11 mg/L Mo (as sodium molybdate) from the test described in example 1. After 3 days of incubation at 24° C. over 99% of the ferrous iron was biooxidized in all eight flasks as indicated by solution Eh measurements. Then, Na molybdate from a 48.9 g Mo/L stock solution (described in example 1) was added to the flasks in various amounts. After 5 minutes, to allow for possible Mo complexation with ferric iron, additional ferrous iron was added to all flasks. The initial concentration of ferrous iron was determined by titration with permanganate. Dissolved Fe and Mo were determined by ICP spectroscopy. Ferric iron was determined by subtraction of ferrous iron from total iron (Table 1).

TABLE 1

Contents of Flasks to Test of Effects of Ferric Iron on Mo Toxicity.

| Flask | Initial Fe (II) g/L | Initial Fe (III) g/L | Initial total Fe g/L | Initial Mo mg/L | Outcome (6 days incubation) |
|---|---|---|---|---|---|
| L-C | 4.4 | 3.2 | 7.6 | 0 | All Fe biooxidized |
| L-1 | 4.2 | 3.3 | 7.5 | 14 | All Fe biooxidized |
| L-2 | 4.0 | 3.3 | 7.3 | 124 | All Fe biooxidized |
| L-3 | 4.0 | 3.0 | 7.0 | 1106 | Fe not biooxidized |

TABLE 1-continued

Contents of Flasks to Test of Effects of Ferric Iron on Mo Toxicity.

| Flask | Initial Fe (II) g/L | Initial Fe (III) g/L | Initial total Fe g/L | Initial Mo mg/L | Outcome (6 days incubation) |
|---|---|---|---|---|---|
| H-C | 5.0 | 5.9 | 10.9 | 0 | All Fe biooxidized |
| H-1 | 5.5 | 6.0 | 11.5 | 13 | All Fe biooxidized |
| H-2 | 5.4 | 6.5 | 11.9 | 117 | All Fe biooxidized |
| H-3 | 5.4 | 6.2 | 11.6 | 1090 | All Fe biooxidized |

Flasks were incubated at 24° C. with shaking at 180 rpm. After 50 hours, the added ferrous iron was completely (>99%) biooxidized in all the "H" flasks (containing the higher concentration of iron). Iron was also completely oxidized in the "L" flasks except in the L-3 flask which was only 15% oxidized. Iron was not further biooxidized in this flask after 6 days of incubation.

The results showed complete biooxidation of the added ferrous iron occurred in the presence of relatively high (ca. g/L) concentrations of Mo. The higher tolerance of iron-oxidizing microorganisms to Mo correlated with the addition of higher concentrations of ferric iron to the culture medium.

EXAMPLE 3

This test showed that ferric iron produced abiotically by oxidation of ferrous iron with peroxide exhibited properties similar to ferric iron produced by biooxidation with respect to enabling iron biooxidation at relatively high concentrations of Mo. This indicated ferric iron and not some other metabolite was responsible for enabling iron biooxidation at elevated concentrations of Mo.

Ferric iron was produced abiotically by adding 1.3 mL 30% $H_2O_2$ dropwise with stirring to 100 mL of a solution of 0.2N $H_2SO_4$ containing 12 g/L Fe(II) as ferrous sulfate heptahydrate. The final pH was 1.47 and the Eh was 878 mV indicating virtually all the iron had been oxidized.

Ferric iron was produced biologically from 2×MKM culture medium containing 25 g/L Fe(II) (as ferrous sulfate heptahydrate). The medium was inoculated with a mixed culture of mesophilic iron-oxidizing microorganisms. After incubation for one week with shaking at 24° C., cell numbers had increased to $4 \times 10^8$/mL and virtually all iron was oxidized as indicated by a solution Eh of 890 mV. The pH was 1.52. The solution was filtered through a 0.45 µm membrane filter and then through a 0.22 µm membrane filter to remove the microorganisms. Following filtration the solution contained 22.1 g/L of dissolved Fe as determined by ICP spectroscopy.

Biooxidized iron solution (12 mL) or peroxide-oxidized iron solution (25 mL) was brought to a total of 45 mL with 2×MKM culture medium. Ferrous sulfate was added to provide 6 g/L Fe(II). Mo was added from a concentrated sodium molybdate stock solution (Table 2). Control flasks contained 45 mL culture medium with ferrous sulfate only. Flasks were inoculated with 5 mL of a 6 day old culture of mixed mesophilic iron-oxidizing microorganisms growing in 2×MKM plus 6 g/L Fe. This flask had been inoculated with a mix of mesophilic iron oxidizing cultures grown previously in flasks containing ferrous sulfate and sodium molybdate and in columns undergoing molybdenite bioleaching. Initial dissolved iron and molybdenum concentrations were determined by ICP spectroscopy. Incubation was for up to 15 days at 24° C. with shaking at 180 rpm. Solution pH and Eh were monitored periodically.

TABLE 2

Test to Determine if Method of Fe (II) Oxidation
Affects Protection of Cells by Fe (III) from Mo Toxicity.

| Flask | Initial Fe (II), g/L | Initial Fe (III), g/L | Initial total Fe, g/L | Initial Mo, mg/L | Outcome (15 days incubation) |
|---|---|---|---|---|---|
| bio Fe (III) | 6.0 | 6.1 | 12.1 | 0 | All Fe biooxidized |
| bio Fe (III) | 6.0 | 6.2 | 12.2 | 920 | All Fe biooxidized |
| Peroxide Fe (III) | 6.0 | 6.5 | 12.5 | 0 | All Fe biooxidized |
| Peroxide Fe (III) | 6.0 | 6.5 | 12.5 | 941 | All Fe biooxidized |
| no Fe (III) | 6.0 | 0.8 | 6.8 | 0 | All Fe biooxidized |
| no Fe (III) | 6.0 | 0.7 | 6.7 | 960 | Fe not biooxidized |

Complete biooxidation of Fe occurred within 6 days in the presence of 920 to 941 mg/L Mo with either biooxidized iron or peroxide-oxidized iron, as indicated by solution Eh which increased to over 900 mV from an initial 672 mV to 677 mV (621 mV with no added ferric iron). In contrast, the Eh in the flask containing no added ferric iron (except a small amount from the inoculum) and 960 mg/L Mo remained almost unchanged at 639 mV after 15 days.

The results indicate ferric iron protects iron oxidizing microorganisms from inhibition by Mo. Furthermore, ferric iron is protective whether produced by biooxidation of from peroxide oxidation. Thus, other microbial metabolites such as amino acids are not required to protect cells from inhibition by Mo.

Reagent ferric sulfate (RFS) was also found to protect iron-oxidizing microorganisms from Mo inhibition, depending on the chemical supplier. A series of Erlenmeyer flasks received 45 mL of MKM medium containing 6 g/L ferrous iron (as ferrous sulfate), with or without 1.0 g/L of Mo (as Na molybdate) and with or without reagent ferric sulfate obtained from two commercial suppliers (Table 3). Flasks were inoculated with 5 mL of an active culture of iron-oxidizing microorganisms growing in 2×MKM containing 16 g/L Fe.

Within 5 days all iron was biooxidized (Eh>900 mV) in flasks containing RFS from supplier 2 as well as in the control with no added Mo. Even after 26 days, little Fe was biooxidized (less than 15 mV increase in Eh) in flasks containing RFS from supplier 1 or in the control containing no Mo. The RFS from supplier 1 was therefore inhibitory to the iron-oxidizing organisms. The RFS remained inhibitory even if pretreated with aeration for two weeks or with peroxide. These results show that some forms of commercial reagent ferric sulfate contain material inhibitory to the growth of iron-oxidizing microorganisms.

TABLE 3

Effects of RFS on Iron-Oxidizing Microorganisms.

| Flask | RFS added supplier 1 | RFS added supplier 2 | Energy source | Mo added | Outcome (26 days incubation) |
|---|---|---|---|---|---|
| RFS-1 | 6 g/L Fe (III) | — | Fe (II) 6 g/L | None | Fe not biooxidized |
| RFS-1 + Mo | 6 g/L Fe (III) | — | Fe (II) 6 g/L | 1.0 g/L | Fe not biooxidized |
| RFS-2 | — | 6 g/L Fe (III) | Fe (II) 6 g/L | None | All Fe biooxidized |
| RFS-2 + Mo | — | 6 g/L Fe (III) | Fe (II) 6 g/L | 1.0 g/L | All Fe biooxidized |
| Control | — | — | Fe (II) 6 g/L | None | All Fe biooxidized |
| Control + Mo | — | — | Fe (II) 6 g/L | 1.0 g/L | Fe not biooxidized |

EXAMPLE 4

This test showed that increasing the concentration of ferric iron in the medium would allow biooxidation of Fe(II) to proceed at increased concentrations of Mo.

A 500 mL culture containing 2×MKM medium and 12 g/L Fe(II) (as ferrous sulfate heptahydrate) at pH 1.5 was inoculated with a blend of active iron oxidizing microorganisms growing in 2×MKM plus iron medium (2 mL) and a refrigerated suspension of cells recovered from laboratory column bioleaching tests. The culture was placed on a shaker at 30° C. The pH and Eh were monitored and the pH adjusted to 1.6 with sulfuric acid as necessary. After 9 days all the iron was biooxidized as indicated by an Eh of 943 mV.

Fifty mL aliquots of the biooxidized solution containing the iron-oxidizing microorganisms were placed in four separate shake flasks, each receiving 6 g/l Fe(II) as ferrous sulfate heptahydrate and either 0, 1, 2, or 3 g Mo/L from a 50 g/L Mo (as sodium molybdate) stock solution. The pH was adjusted to 1.5 with sulfuric acid. After two days of incubation at 25° C. and 200 rpm shaking all the iron had been oxidized as measured by Eh and by titration with permanganate. This indicated that Fe biooxidation was not affected even by 3 g/L dissolved Mo.

To determine if cells were able to grow as well as to oxidize Fe in the presence of >1.0 g/L concentrations of Mo, a cell-free ferric solution was obtained by filtering the remaining contents of the flask mentioned above in which 12 g/L Fe(II) had been completely biooxidized. The solution was filtered first through a 0.45 µm membrane filter and then through a 0.2 µm membrane filter. Forty five mL aliquots of the cell-free filtrate were added to 4 flasks along with 0, 1, 2 or 3 mL of the 50 g Mo/L solution, 1.5 g of ferrous sulfate heptahydrate and 5 mL of active cells that had grown in the 0 g/L Mo flask above. The actual iron and Mo concentrations were determined by ICP spectroscopy after centrifugation of the solutions at 1200×g for 5 min. Starting iron concentrations ranged from 15.8 to 16.1 g/L and the initial pH values ranged from 1.6 to 1.7. After 6 days of incubation iron was completely biooxidized in all flasks as indicated by an increase in Eh from an initial 680 to 685 mV to over 900 mV after 4 to 6 days (FIG. 2). It took two days longer for iron to be completely biooxidized at the highest Mo concentration indicating microbial growth was somewhat slower at the higher Mo concentrations. Analyses at the end of the test indicated dissolved Mo and Fe concentrations did not decrease over the course of the test.

To confirm that the iron-oxidizing microorganisms were growing in the presence of high concentrations of Mo, the culture grown at 912 mg/L Mo (FIG. 2) was inoculated (5 mL) into 45 mL of biooxidized and filtered (0.2 μm) 2×MKM medium containing either 12 g/L ferric iron (Flask E-1) or 22 g/L ferric iron (Flask E-2). Ferrous sulfate (6 g/L Fe) and Mo stock solution (3 mL of 50 g/L) were added prior to inoculation. Incubation was for 6 days at 24° C. with shaking at 180 rpm. Metal concentrations were determined by ICP spectroscopy after centrifugation of samples for 5 min at 1200×g. Microbial cell numbers were determined with a Petroff-Hausser bacteria counter. The pH and Eh were determined daily.

The results showed that the cultures grew and oxidized iron in the presence of nearly 3 g/L Mo (Table 4). Intermediate Eh measurements and cell counts showed growth rates in the two flasks were similar. Microscopic examination after 4 days of incubation showed many of the microbial cells to be curved rods or coiled, resembling *Leptospirillum*. Motility was observed, indicating living cells.

TABLE 4

Growth of iron-oxidizing microorganisms in the presence of Mo.

| Flask | Fe, g/L | Mo, mg/L | pH | Eh, mV SHE | Cells/mL |
|---|---|---|---|---|---|
| E-1 initial | 17.2 | 2810 | 1.57 | 682 | $0.9 \times 10^7$ |
| E-1 final (6 days) | 17.6 | 2907 | 1.58 | 933 | $1.6 \times 10^8$ |
| E-2 initial | 25.2 | 2885 | 1.56 | 694 | $1.1 \times 10^7$ |
| E-2 final (6 days) | 25.3 | 2933 | 1.53 | 939 | $1.7 \times 10^8$ |

EXAMPLE 5

In order to determine the relationship between dissolved iron concentration and highest concentration at which iron-oxidizing microorganisms could bioleach molybdenite, the final cultures from example 4 (flasks E-1 or E-2) were added to flasks containing various amounts of biooxidized ferric iron (filtered solution containing 22.1 g/L Fe from example 3) or fresh MKM medium with or without added ferrous sulfate heptahydrate. All flasks received high purity molybdenite (Molyform M5, H. C. Starck, Goslar, Germany) (Table 5).

TABLE 5

Contents of flasks in molybdenite bioleaching test.

| Flask | Biooxidized Fe solution (22.1 g/L Fe) | Culture solution (example 4) | 2X MKM | Ferrous sulfate | Molybdenite |
|---|---|---|---|---|---|
| F-1 | 20 mL | 20 mL of E-2 | 0 | 0 | 0.805 g |
| F-2 | 20 mL | 20 mL of E-1 | 0 | 0 | 0.805 g |
| F-3 | 0 | 20 mL of E-1 | 20 | 0 | 0.803 g |
| F-4 | 0 | 5 mL of E-1 | 45 | 1.35 g | 1.005 g |

The initial concentrations of dissolved Fe and Mo were determined by ICP spectroscopy following centrifugation at 1200×g for 5 min (Table 6). Flasks were incubated at 24° C. with shaking at 180 rpm for 79 days.

TABLE 6

Initial solution parameters in molybdenite bioleaching test.

| Flask | pH | Eh, mV | Fe, g/L | Mo, mg/L |
|---|---|---|---|---|
| F-1 | 1.54 | 832 | 21.5 | 1369 |
| F-2 | 1.56 | 859 | 18.3 | 1357 |

TABLE 6-continued

Initial solution parameters in molybdenite bioleaching test.

| Flask | pH | Eh, mV | Fe, g/L | Mo, mg/L |
|---|---|---|---|---|
| F-3 | 1.49 | 826 | 7.96 | 1321 |
| F-4 | 1.44 | 649 | 7.10 | 287 |

The Eh rapidly decreased to about 720 mV in flasks F-1, F-2 and F-3 in the first two days after the test was begun likely due to reaction of ferric ions with molybdenite (FIG. 3). However, at this Eh dissolved iron was still >90% in the ferric species. The Eh after 20 days sharply increased in flask F-2 and after 45 days in flask F-1. In contrast, after 80 days there was no indication of iron biooxidation (Eh increase) in flasks F-3 or F-4.

Mo extraction curves were similar to the Eh curves. Concentrations of dissolved Mo began increasing as the Eh increased to more than 750 mV resulting from biooxidation of iron (FIG. 4). These results indicate the high potential (750 mV) required for molybdenite bioleaching and that high concentrations of ferric iron are required for biooxidation of ferrous iron in the presence of high dissolved Mo concentrations.

The maximum concentration of dissolved Mo in solution was about 4 g/L (FIG. 4). As the concentration of dissolved Mo in flask F-2 approached 4 g/L the Eh began decreasing. This could reflect decreasing iron oxidation by the microorganisms due to Mo toxicity or might reflect Mo precipitation as dissolved Mo concentrations also began to decline.

This test was repeated by adding 1.0 g quantities of molybdenite to 4 flasks each containing 50 mL aliquots of a culture of active iron-oxidizing microorganisms containing 20 g/L Fe at a pH of 1.68, Eh of 770 mV (indicating >95% iron was ferric) and $1.8 \times 10^8$ cells/mL. Initial dissolved Mo concentrations were 155 to 167 mg/L in two of the flasks. The other two flasks received 0.5 mL and 1.5 mL of a concentrated (50 g Mo/L) sodium molybdate stock solution giving initial Mo concentrations in flasks of 666 and 1595 mg/L as determined by ICP spectroscopy.

Flasks were incubated at 24° C. and 180 rpm for 63 days. Again the initial solution Eh declined to about 710 mV. The Eh began increasing in all flasks after a lag of 21 days, exceeding 750 mV after 32 days and 850 mV after 53 days. Dissolved Mo concentrations by day 63 had increased to 3353 and 3581 mg/L in the two flasks not initially spiked with sodium molybdate. Dissolved Mo was 3919 and 4404 mg/L in the flasks that received the initial spike of 0.5 mL and 1.5 mL of sodium molybdate solution, respectively.

These results confirmed that at high solution Fe concentrations biooxidation can leach Mo from molybdenite to achieve high dissolved solution Mo concentrations.

We demonstrated that microbial growth and iron oxidation at high solution Mo concentrations was not due to selection of Mo-resistant microbial strains. Cells were recovered from molybdenite solids from the flask containing 3581 mg/L dissolved Mo and 20 g/L ferric iron. The molybdenite was allowed to settle by gravity. The solution phase was decanted and set aside. An aliquot of fresh 2×MKM medium containing no Mo and no Fe was added to gently rinse the molybdenite. The solids were allowed to settle again. The solution phase was again decanted. In this manner, most of the dissolved Mo and Fe(II) was removed from the slurry. Additional 2×MKM was added and the solids were shaken extremely vigorously to dislodge the cells. After 5 min standing, the solution phase contained $1.7 \times 10^8$ cells/mL, mostly curved and spiral-shaped *Leptospirillum*-like bacteria. The cell counts indicated that almost all of the microorganisms had been firmly attached to molybdenite in the original culture solution, <1% were present in the decant solutions based on the microscopic cell counts.

Aliquots (1.0 mL) of the cell suspension obtained from vigorous shaking of the solids were added to 2×MKM containing 4.5 g/L Fe(II) and various concentrations of Mo (as sodium molybdate) ranging from 4.4 to 922 mg/L. The initial cell count was $3.4 \times 10^6$ cells/mL. Incubation was at 24° C. with shaking at 180 rpm for 11 days.

Microorganisms in the cell suspension recovered from the molybdenite solids did not grow or oxidize iron when placed in ferrous sulfate culture medium containing 97 mg/L Mo or 922 mg/L Mo—cell counts after 11 days were less than $10^6$/mL and Eh and permanganate titration indicated no significant Fe oxidation had occurred. Conversely, good growth and complete iron biooxidation occurred when the suspension was inoculated into culture medium containing low concentrations of Mo (4.4 and 14 mg/L Mo)—highly motile cells of *Leptospirillum*-like bacteria were observed, cell counts exceeded $10^8$/mL and iron was completely biooxidized as determined by Eh measurements and permanganate titrations.

The results showed cells that were bioleaching molybdenite in solutions containing at high dissolved Mo concentrations (3.6 g/L) and high ferric iron concentrations were completely inhibited by 97 mg/L Mo when diluted into fresh culture medium containing little Fe(III). This indicates that selection of a Mo-resistant strain of microorganism was not responsible for growth in high Mo concentrations. Rather, high concentrations of ferric iron in solution enable iron biooxidation and molybdenite bioleaching at high solution Mo concentrations.

EXAMPLE 6

The rate of bioleaching of molybdenite was found to be faster at higher temperatures and smaller particle sizes which is important for designing a molybdenite bioleaching process. Two types of molybdenite samples were tested.

Lubrication grade, high purity molybdenite products (Molyform® M5, M15, M30, and M50) of various particle sizes were supplied by H. C. Starck, Goslar, Germany. The specific surface areas (in m²/g) were: M5, 9.03; M15, 5.21; M30, 3.65; and M50, 3.42. Particle sizes ($P_{90}$) were: M5, 2.9 µm; M15, 12 µm, M30, 27 µm and M50, 36 µm.

Molybdenite-containing solids also were obtained from waste streams from a copper concentrator plant in the Western United States. These materials included a sample of first cleaner tails containing 4% molybdenite, 53% chalcopyrite, and <3% pyrite, with the remainder consisting mostly of talc and silica. A composite sample of other waste stream samples consisted of 40% chalcopyrite, 7% molybdenite, <3% pyrite, with the remainder consisting mostly of talc and silica. The first cleaner tails and composite samples were reground. Chalcopyrite was removed by bioleaching at 65° C. with a mixture of iron- and sulfur-oxidizing extreme thermophiles including *Sulfolobus metallicus, Acidianus brierleyi* and *Metallosphaera sedula*. Feeds were added (10% solids) to 2 liters of 2×MKM solution in stirred and aerated reactors. The solution Eh in these tests was relatively low (<700 mV) and Mo was not mobilized under these conditions. When solution analyses indicated Cu extraction approaching 100%, the residue, containing pyrite and molybdenite, was recovered, rinsed, and analyzed. Virtually no Mo was dissolved by treatment of biodecopperized residues with hot 3N HCl, indicating Mo had not been mobilized and reprecipitated.

The microbial culture used in bioleaching tests originally contained mixed iron and sulfur oxidizing acidophiles obtained from mine waters. It was grown and maintained in shaken and aerated vessels at room temperature (ca. 24° C.) on a mix of pyrite, sulfur, chalcopyrite and molybdenite added to 2×MKM mineral salts solution adjusted to pH 1.4 to 1.6 with sulfuric acid.

Molybdenite bioleaching studies were performed by adding molybdenite (0.6 g/L) to flasks containing 2×MKM solution plus 6 g/L ferrous iron as ferrous sulfate heptahydrate. The pH was adjusted to 1.4 to 1.6 with sulfuric acid. Flasks were inoculated with active cultures of bacteria pregrown on iron plus molybdenite and were shaken (180 rpm) at various temperatures. Solutions were sampled periodically for the determination of pH, redox potential (Pt electrode, Ag/AgCl reference electrode), and dissolved metals by ICP spectroscopy. All redox potentials are expressed relative to standard hydrogen electrode (SHE).

There was a clear correlation between surface area and biooxidation rate of high purity molybdenites (FIG. 5). The initial Mo bioleaching rate (approximately first 20% of Mo extracted in duplicate flasks) increased with decreasing particle size, ranging from 1.77%/d with M50 to 4.91%/d with M5. The average bioleaching rate for the four molybdenites at 24° C. was 3.22 Mg Mo/m²/d (s.d.=0.25) corresponding to $3.88 \times 10^{-10}$ mol $MoS_2$/m²/s (s.d.=0.30).

The maximum extent of Mo extraction in these tests also was dependent on particle size. Over 80% of the Mo from M5 was extracted in duplicate flasks after 50 days of bioleaching whereas less than 30% of Mo was extracted from M50 in duplicate flasks after 75 days of bioleaching.

Regrinding of a commercial molybdenite concentrate increased Mo extraction from 12% (as received) to 28% (reground) after one month of bioleaching.

Bioleaching rates of molybdenite also increased with temperature. Mo was bioleached from molybdenite in the composite mineral processing waste material at 2.5%/d at 25° C., increasing to 10.2%/d at 40° C. (Table 7).

Data over the first 40% to 60% Mo extraction were fit to a shrinking core model for determination of bioleaching rates. An Arrhenius plot of log K versus reciprocal temperature gave a linear relationship ($r^2$=0.995), resulting in a calculated an apparent activation energy of 73.4 kJ/mol.

TABLE 7

Effect of temperature on rate of molybdenum bioleaching from composite mineral processing waste material.

| Temperature, ° C. | Mo extraction rate, %/day |
|---|---|
| 25 | 2.52* |
| 30 | 3.92* |
| 35 | 6.17* |
| 39 | 8.90 |
| 40 | 10.2 |
| $Q_{10}$ (40/30) | 2.60 |
| $Q_{10}$ (35/25) | 2.45 |

*mean of duplicates

Bioleaching tests of high purity molybdenite (M5) also were performed over a temperature range of 25° C. to 40° C. These results gave a linear Arrhenius plot yielding a similar apparent activation energy of 61.2 kJ/mol.

A process for the biooxidation of molybdenite should aim for the upper end of the mesophilic temperature range (ca. 40° C.) as extreme thermophiles at 65° C. did not further increase the rate of $MoS_2$ bioleaching.

EXAMPLE 7

Control of leach solution chemistry, specifically the concentration of iron, was determined to be a critical process specific operating parameter necessary to reduce Mo toxicity to mesophilic and acidophilic Fe-oxidizing microbial populations. Mo toxicity was readily apparent in the example described below as an observed decrease in the oxidation-reduction potential of leach solution as inhibited cells failed to oxidize ferrous iron to ferric iron at a sufficient rate to prevent its accumulation in solution. A process requirement for soluble iron was readily demonstrated in leach columns used to simulate heap bioleaching environments.

Column feed. A concentrator waste stream (DSO) was dried and used without further modification in columns described below to evaluate molybdenite bioleaching. The solid material was characterized by XRD/XRF analysis as follows (weight percentages): $CuFeS_2$ (48%); $MoS_2$ (6.6%); $FeS_2$ (<3%); $S—S^{2-}$ (23%); talc (18%); and quartz (15%). The particle size distribution was 5-25 µm.

A. Long-term adaptation Column 5. Approximately 750 g of minus ¼ inch andesite gravel was agglomerated with 179 g of chalcopyrite/molybdenite feed using 1N $H_2SO_4$ as an agglomerating aid. The agglomerated material was used to charge a 0.05 m diameter polycarbonate column, producing an active bed height of 32 cm. The column was operated at room temperature for a total of 460 days. Leach solution was applied at a rate of 0.003 gal/sq.ft./min to the top of the column via a peristaltic pump. Aeration was via a port at the base of the agglomerated bed at a rate of 1.2-1.5 L/min.

Inoculum. The column was inoculated with 200 mL of an active mixed mesophilic culture used previously to bioleach molybdenite. Initially, the culture was mixed with 800 mL 9K basal salts solution, giving an initial suspended cell concentration of $1.25 \times 10^6$ cells/mL, and then pumped through the column bed.

Leach solution composition. The 9K stock media consisted of, in grams per liter, $(NH_4)_2SO_4$ (3.0), KCl (0.1), $MgSO_4 \cdot 7H_2O$ (0.5), $K_2HPO_4$ (0.5), and $Ca(NO_3)_2 \cdot 4H_2O$ (0.01). Full-strength or a 1:10 dilution of 9K basal salts solution was used as indicated for specified intervals of time. Final solution iron concentrations were adjusted during the leach cycle. Additional 11N $H_2SO_4$ was added to the reservoir during the leach cycle as needed to control pH.

Initially, the 9K leach solution (pH 1.75) was amended with approximately 2.5 g/L ferrous iron. The leach solution was replaced by fresh 9K+2.5 Fe after 31 days to reduce the circulating concentration of copper. Partial replacement of media (200 mL) was also done on days 389 and 418, although the replacement solution was 0.1× strength 9K amended with 20 g/L Fe.

The concentration of iron in leach solution was gradually adjusted upward over time, with additional ferrous iron added to the leach solution reservoir in solid form as $FeSO_4 \cdot 7H_2O$ on days 53 (+5 g/L); day 143 (+5 g/L); day 195 (+8 g/L); day 276 (+5 g/L) and sufficient addition on days 389 and 418 to maintain 20 g/L of Fe already present in solution upon partial solution replacement.

Sampling/analysis. The reservoir was sampled routinely, with deionized water added as needed to compensate for evaporative loss, and analyzed for solution pH, concentrations of Mo, Cu and Fe and solution oxidation-reduction potential. ORP was reported relative to the standard hydrogen electrode. Metals concentrations were determined by ICP spectroscopy.

Experimental bioleach of molybdenite feed. Over the course of 460 days, less than 50% and 20% of feed Cu and Mo, respectively, were mobilized from the feed (FIG. 6). Copper dissolution largely preceded extensive Mo dissolution. During the progress of the bioleach, the leach solution was modified by increasing the concentration of ferrous iron on days 53, 143, 195 and 276, as indicated in FIG. 7, which illustrates the concentrations of Fe and Mo in the circulating leach solution. Days upon which the solution iron concentration was increased are indicated by arrows. Of note were the apparent plateaus in the concentration of Mo. Movement above those adaptation plateaus can be seen to be preceded by adjustment of solution iron concentrations (as iron sulfate). These observations were among the first to relate Mo tolerance and leach solution chemistry. At termination, a maximum solution concentration of 1.86 g/L Mo was achieved and corresponded to a solution Fe concentration of 24.2 g/L. A high oxidation-reduction potential at this Mo concentration (901 mV, SHE) indicated that microbial Fe-oxidizing activity was not inhibited by the high concentration of soluble Mo.

A examination of the solution oxidation-reduction potential (ORP) during a 111 day interval of bioleaching clearly indicated the benefit of addition of iron to the leach system (FIG. 8). Here, the solution potential at day 231 exceeded 900 mV (1.23 g/L Mo) after increasing due to microbial iron-oxidation following a previous addition of ferrous iron (day 195). The potential reached a maximum of 938 mV on day 248 (1.28 g/L Mo), thereafter decreasing by 143 mV to a potential of only 795 mV by day 276 (1.49 g/L Mo). This was a clear indication that the increasing concentration of Mo had reached a level inhibitory to microbial Fe-oxidizing activity at a leach solution Fe concentration of only 16.5 g/L. Hence, sufficient Fe was added to the leach solution on day 276 to achieve in excess of 20 g/L Fe after complete circulation and mixing of the leach solution. Addition of Fe to the leach solution is indicated by an arrow is (FIG. 8). The solution potential first decreased in response to the addition of Fe(II), but then increased by day 304 to 907 mV (1.49 g/L Mo), indicating that the microbial Fe-oxidizing activity was no longer inhibited.

B. Long-term adaptation Column 72. Another 0.05 m diameter column was assembled to further demonstrate the effect of solution Fe on Mo toxicity to metal sulfide-oxidizing microbial populations in heap environments. Approximately 602 g of minus ¼ inch andesite gravel was agglomerated with 75.3 g of chalcopyrite 1 molybdenite feed using 1N $H_2SO_4$ as an agglomerating aid. The active bed was underlain by 250 g of andesite rock to serve as a drainage layer. The active bed of agglomerated feed was similarly overlain with 101 g of andesite to serve as an overburden to aid in more evenly distributing applied leach solution. Aeration and leach solution application rates are as described above in this example. The column was operated at room temperature for a total of 194 days.

Inoculum. The column was inoculated with a mix of 200 mL of a refrigerated, mixed mesophilic stock culture used previously to bioleach molybdenite and 800 mL of a cell suspension of biomass recovered following termination of the column described above in this example. Here, cells were rinsed from the bioleached residue using a solution of 9K+7.5 g/L Fe(II). The solids were allowed to settle and the cell suspension recovered by decantation. The reservoir had an initial suspended cell concentration of $9.0 \times 10^7$ cells/mL. This suspension was pumped through the column bed until replaced with fresh media, as described below.

Leach solution compositions. Except when noted, 9K stock media was used as described above in this example. Again, solution iron concentrations were adjusted during the leach cycle. Additional 11N $H_2SO_4$ was added to the reservoir during the leach cycle as needed to control pH. Initially, the 9K leach solution was amended with approximately 7.5 g/L ferrous iron (pH 1.59). The leach solution was replaced with fresh solution at this Fe concentration on days 6, 68 and 106. However, it was of interest to demonstrate the impact of reducing the concentration of Fe in solution on the toxicity of Mo. Hence, solution replacement on days 40 and 49 consisted of fresh 9K amended with only 2.5 g/L ferrous iron. A final leach solution replacement on day 141 consisted of a "low nutrient concentration" formulation consisting of dilute sulfuric acid amended with 0.1 g/L $(NH_4)_2SO_4$ and 7.5 g/L ferrous iron (pH 1.29).

Experimental bioleach of molybdenite feed. The course of Mo and Cu dissolution is summarized in FIG. 9. Between days 17 and 27, the rate of Mo dissolution approached 0.8%*day$^{-1}$, while the rates of Mo and Cu dissolution were virtually identical from day 51 to day 159 (0.25%/day vs. 0.22%/day, respectively). After 194 days, 68% of Cu and 49% of Mo had been leached from the feed material.

However, it was of interest to further demonstrate the contribution of leach solution iron concentrations to a reduction in the toxicity of soluble Mo. The experimental approach involved operating this column for a period of time using a leach solution containing 6-8 g/L Fe, replacing the leach solution with one containing only 2-3 g/L Fe for a brief time interval, and finally returning the Fe to the initial concentration of 6-8 g/L (FIG. 10), meanwhile determining the extents of Mo dissolution and microbial activity under these various conditions. Again, the microbial inoculum for this experiment was pre-adapted in the column experiment described above. Initially, soluble Mo exceeded 600 mg/L after 40 days when leach solution iron concentrations exceeded 5.5 g/L (FIGS. 10, 11). This was accompanied by a drop in solution redox potential of 82 mV between day 37 and day 40 without concomitant Fe precipitation (indicated by arrow in FIG. 12). The decrease in solution potential indicated that the Fe-oxidizing microbial cells had reached their tolerance level for Mo under these solution conditions.

A profound change occurred when the leach solution Fe concentration was reduced to 2-3 g/L (FIG. 10) on day 40. Molybdenum dissolution reached a plateau at approximately 237 mg/L (day 63). The solution potential thereafter decreased by 57 mV from day 65 to day 68 (indicated by arrow in FIG. 12). A decrease in the oxidation-reduction potential in the absence of any obvious Fe precipitation indicated that microbial Fe-oxidizing activity in the column was inhibited, but at a much lower concentration of Mo. Microbial tolerance to Mo had in fact decreased by approximately 61%. The low Fe leach solution was again replaced by one containing 6-8 g./L Fe. The trends reversed upon increasing solution iron concentrations to previous levels (6006-7500 mg/L). The concentration of Mo in the leach solution reached 494 mg/L by day 94 at high solution potential (>900 mV).

It is clear from these results that tolerance of the mesophilic microbial populations to Mo is controlled by the leach solution Fe concentration beyond the extent of their physiological adaptations. The optimal Fe:Mo molar ratio was approximately 20:1. This ratio may depend somewhat on the concentrations of other species in solution such as copper, bisulfate and phosphate.

EXAMPLE 8

It was of interest to demonstrate the potential for bioxidizing molybdenite ($MoS_2$) in a heap configuration under mesophilic conditions. A column configuration was used to simulate a 1.5 m lift in a heap environment.

Solid feed preparation. The unaltered feed was a weighted mixture of three solid fractions representing individual feed streams within a chalcopyrite ($CuFeS_2$) processing circuit. The unaltered blend contained 5.22% Mo, 14.6% Cu, 14.2% Fe and 19.4% total sulfur, with a particle size distribution of 5-50 µm. However, because of the high Cu content, this blend was pre-treated by first re-grinding and then bioleaching it in columns under moderately thermophilic conditions (~50° C.) to remove a portion of the chalcopyrite component. The feed chalcopyrite content was reduced to lessen competition for ferric ions in the leach solution by the copper and molybdenum sulfides, allowing the system to operate at higher oxidation-reduction potentials required for $MoS_2$ bioleaching. Following this microbial pre-treatment, the partially decopperized solids were recovered, dried and analyzed for residual mineral composition, metal and sulfur content. The composite "head analysis" for the recovered solids (0.36% moisture) was as follows: 6.45% Mo; 3.46% Cu; 5.2% Fe; and 12.11% total sulfur. In addition to molybdenite and chalcopyrite, the XRD/XRF analysis indicated the presence of quartz (40-50%), talc (14%), jarosite (<10%), sulfur (<5%), pyrite (<3%) and unidentified (<5%).

Agglomeration and column loading. A fine particle size required that the molybdenite feed be agglomerated with site rock to maintain permeability in the column. Site rock (−3+6 mesh) was washed prior to use with a 1N $H_2SO_4$ solution. The wash solution was decanted and discarded. The solids, rinsed successively with tap water and deionized water, were then dried prior to use. Approximately 6 kg was used as an underburden drainage layer in the 0.15 m diameter column. Above this layer was placed a 28 kg mass of site rock agglomerated with 3.5 kg of the partially decopperized molybdenite feed, representing a 1.5 m active bed height. A 0.85 kg mass of site rock was used as an overburden to aid in evenly distributing leach solution applied to the surface. A water-jacketed thermistor was inserted into the overburden layer to monitor the bed temperature.

Column operation. Batches of fresh leach solution were composed of the following. 16 liters deionized water, 128 mL 11 N $H_2SO_4$, 1.60 g $(NH_4)_2SO_4$, and 600 g $FeSO_4*7H_2O$, representing an initial Fe(II) concentration of 7500 mg/L. Aeration and leach solution were introduced in standard countercurrent fashion to the room temperature system (23-34° C.). Leach solution was pumped continuously from a reservoir to the top to the column via a multi-channel peristaltic pump at a rate of 0.002-0.003 gal*ft$^{-2}$*Min$^{-1}$. Prior to inoculation, the contents of the charged column were rinsed overnight with leach solution and additional volumes of 11N sulfuric acid added as needed to adjust the solution pH to a value below pH 2.5. Following inoculation, air was pumped into a side port at the level of the bottom drainage layer. While a single air inflow port was used initially, a second air inlet was added to split the flow in order to avoid interruption of air-flow due to plugging of a single air inlet by evaporated salts. Total air inflow remained constant at 4 L/min. Column effluent was collected in a receiving reservoir. The leach solution was monitored on a nearly daily basis for pH, redox potential, Mo, Fe, Cu, $SO_4^{2-}$, Si, Ca, K, and Mg. Periodically, the leach solution was analyzed for $PO_4^{3-}$ and $NH_4^+$ content. Occasionally, dedicated samples were collected for Al, As, Bi, Co, Cr, Cl⁻, total organic C, Na, Ni, Mn, total N, Pb, Re, Sb, Sc, Se, Ti, Tl, U, V, W, Y, $Zn_1$ and Zr.

Inoculation. Stock inoculum contained pooled biomass collected at the termination of previous column experiments in which $MoS_2$ was bioleached. The biomass was dislodged from the solid residues by agitation in leach solution and isolated by gravity separation of solids from the cell suspension. This biomass was pooled with biomass collected from previous harvests and refrigerated until needed.

The demonstration column was inoculated with actively growing cells derived from refrigerated stock inoculum. A 250 mL suspension of Mo-adapted cells was mixed with an equal volume of 0.1×9K basal salt nutrient solution and amended with 3.7 g/L Fe(II), as $FeSO_4.7H_2O$, 1% w/v $FeS_2$ and 0.5% w/v S°. The culture was incubated statically at 25-30° C. with sparge aeration until the cells were actively oxidizing iron. At the time of inoculation, the culture had an oxidation reduction potential of 919 mV (SHE) and a suspended cell concentration of $2.2 \times 10^8$ cells/mL. A total of 500 mL of this culture was applied to the top of the column bed at the standard application rate via a peristaltic pump.

Solution handling. Different strategies of leach solution handling were implemented for controlling the concentrations of Cu and Mo in solution during the leach cycle. Though pre-treated, the feed still contained some chalcopyrite. To remove copper from the leach solution circuit, the reservoir leach solution was partially replaced with fresh media once (day 39) and completely replaced several times (days 16, 28 and 42). In addition, nitrogen availability was increased by supplementing the reservoir leach solution with ammonium sulfate (~3.5 mg/L $NH_3$). At day 28, when 3.75% Mo had been solubilized from the feed, a loop was inserted into the leach solution return line that included a Lewatit resin MP62 module for stripping Mo from solution before returning it to the reservoir.

However, a "lock cycle" mode of operation was initiated on day 44 (11.1% Mo solubilized) and used almost exclusively during the remaining molybdenum dissolution phase. Leach solution was not periodically replaced, but continuously recycled. However, nutrients ($NH_3$—N and $PO_4^{3-}$) were added on two occasions during lock cycle operation to ensure adequate availability to microbial populations of nitrogen and phosphorus. These amendments resulted in nutrient concentrations corresponding to 0.05×9K basal media. Leach solution samples were collected on nearly a daily basis, although toward the end of the column operation, pooled samples representing three days of flow were collected over weekends.

Solids recovery. At completion, a total of 6.42 liters of 0.02 $NH_2SO_4$ was passed through the column to rinse away residual leach solution. Solids were removed from the column and divided roughly into four sections to assess the extent of biooxidation with column depth. Four solid samples were generated: upper, middle, lower, and lower underburden. Prior to being separated from co-agglomerate site rock, small sub-samples of the wet agglomerated material was collected from each section for use in determination of attached biomass (see below). The site rock co-agglomerate and biooxidized fines were separated by a tap water rinse. The slurry was then passed through a 2 mm sieve to separate the fines and larger site rock. After an overnight settling period, some excess water was separated from the fines by siphoning and discarded. The remaining slurries were dried for more than 48 hours at 60-70° C. The dry solids were homogenized by hand, weighed, and sub-sampled for digestion and subsequent analysis. Each of the four solid residues was analyzed by X-ray diffraction (XRD) for residual mineralogy, X-ray fluorescence (XRF) for elemental composition, total sulfur, sulfate, precipitated metals and digested and analyzed for residual metals by ICP spectroscopy.

Estimation of attached biomass. Small quantities of rinsed agglomerated solids (<20 g) were collected at the termination of column operation. The mass of the wet sample was recorded. The samples were submerged in an equal volume of 2×MKM media and shaken for approximately 1 min. The solids were allowed to settle for 5 to 10 min. The resulting cell suspension was used in a standard three-well most-probable-number analysis. Ferrous iron and elemental sulfur were used as energy sources. The assay was miniaturized through the use of a 48 well multi-well plate (1000 μL assay solution volume). The plates were incubated at room temperature (23-26° C.) for 24 days prior to estimation of population density.

Leach chemistry. As shown in FIG. 13, leach solution iron concentrations exceeded 6 g/L for the greater part of the demonstration. Column effluent exceeded pH 2.5 for approximately one week and 11N sulfuric acid was added to the reservoir until pH control was achieved. Thereafter, the system operated between pH 1.3 and 1.6 (FIG. 14).

Oxidation-reduction potentials of column effluent samples are summarized in FIG. 15. After 100 days of operation, the solution potential consistently exceeded 900 mV. The normalized (24 hour) rate of Mo dissolution is summarized in FIG. 16. A maximum rate of 0.9%/day was observed on day 49, corresponding to an effluent oxidation-reduction potential of 779 mV, although there was some zonation of microbial populations and a probable underestimation of the maximum rate and solution potential in upper regions of the bed. This is supported by an examination of the zonal solid residue compositions, as discussed below (see Table 9). Differential Mo concentrations in leach solution (effluent concentration minus influent concentration) were achieved of approximately 1 g/L Mo. The maximum observed daily rate of Mo dissolution also coincided with a change in the kinetics of Cu dissolution, with solution concentrations of Cu afterward increasing linearly with time.

Biomass determinations using a most-probable-number technique showed that densities of attached Fe-oxidizers were quite high in each of the column sections, arguing against any inherent biological inhibition resulting from high localized Mo concentrations in scaled-up systems with proper control of leach solution Fe concentrations. Further, it is apparent upon inspection of Table 8 that molybdenite biooxidation was dominated by iron-oxidizing microbial populations, as the S-oxidizing populations were present at numbers two- to five orders of magnitude less than the Fe-oxidizers.

TABLE 8

Biomass Associated with Recovered Solids from Column Residues.

| Sample | Most - Probable - Number (cells/gram wet weight) | |
|---|---|---|
| | Fe-oxidizers | S-oxidizers |
| Upper | $1.1 \times 10^7$ | $2.4 \times 10^5$ |
| Middle | $>2.4 \times 10^7$ | $2.4 \times 10^5$ |
| Lower | $4.6 \times 10^6$ | $3.9 \times 10^3$ |
| Lower/UB | $>2.4 \times 10^7$ | $7.5 \times 10^2$ |

Lock cycle operation covered a time period during which almost 90% of mobilized Mo entered solution (corresponding to 70% of total Mo in the feed material). A mass balance for the Mo in solution and residues is presented in Table 9. One aspect that is significant was the extent of biooxidation with depth in the column. There appeared to be a top-down pattern of oxidation for both copper (chalcopyrite) and molybdenum (molybdenite) despite the presence of comparable numbers of attached Fe-oxidizers. After correcting for the jarosite and gypsum content of the four column residues, the estimated extent of Mo dissolution from each fraction (from top to bottom) was: Upper (89%), Middle (84%), Lower (76%) and Lower/UB (70%).

TABLE 9

Mass Balance for Molybdenum and Copper Content of Recovered Solid Residues.

| Sample | Recovered Residue (g) | % Recovered Residue | % Mo [1] | % Cu [1] |
|---|---|---|---|---|
| Head [5] | | | 6.45 | 3.46 |
| Upper | 1060 | 24.8 | 0.72 | 0.42 |
| Middle | 1207 | 28.2 | 0.96 | 0.56 |
| Lower | 1276 | 29.8 | 1.42 | 0.61 |
| Lower/UB [2] | 738 | 17.2 | 1.66 | 0.60 |
| Total [3] | 4280 | 100 | 1.16 [4] | 0.55 |

[1] metal content determined by ICP-AES following chemical digestion (heated $HNO_3$, $H_2O_2$, HCl) of solid residue
[2] UB- underburden
[3] Mo mass accountability 96.6%. Total Mo Accountability: solid residues Mo, 49.586 g; leach solution Mo, 162.13 g; subtotal Mo: 211.72 g; initial Mo in feed, 219.1 g; initial Cu in feed: 117.6 g
[4] weighted percentage
[5] composite head analysis of de-copperized feed: 6.45% Mo; 3.46% Cu; 5.2% Fe; 12.11% total sulfur A comparison of Mo dissolution data from a small column of similar configuration was made to those from the 1.5-meter bed column—a mass scale-up of approximately 45× (FIG. 17). Mo dissolution in the large column was somewhat superior.

EXAMPLE 9

The effects of Fe(III) concentration on molybdenite bioleaching have been investigated. Improvement in molybdenite bioleaching rates at higher dissolved iron concentrations were observed in shake flask tests. These contained 0.2% (w/w) of molybdenite-containing decopperized 3-part composite in leach solution initially containing either 2.5 g/L Fe(II) as ferrous sulfate (duplicate flasks 13 and 14) or 0.5 g/L Fe(II) (flasks 15 and 16). After inoculation and 50 days of bioleaching, Mo extraction was 53% to 56% in flasks 13 and 14, but was only 40% to 41% in flasks 15 and 16. The lower extraction rate in flasks 15 and 16 To correlated with a lower solution redox potential than in flasks 13 and 14. Although the redox potentials were relatively high in all 4 flasks during Mo bioleaching (>850 mV SHE or >99% iron as ferric iron), potentials in flasks 13 and 14 were consistently about 50 mV higher than in flasks 15 and 16. This indicates that the microorganisms were better able to maintain high solution redox potentials at the higher dissolved iron concentrations.

However, the beneficial effects of higher solution iron concentrations do not necessarily extend to much higher dissolved Fe concentrations as shown in Mg-1 and Mg-2 shake flasks. Here, Mo bioleaching rates from 3-part composite (0.6% solids) were nearly identical in flasks initially containing 6 g/L Fe(II) as compared to 12 g/L Fe(II) (FIG. 18). Solution redox potentials also were similar and were >900 mV. It appears that as long as dissolved Fe(III) is present above a certain threshold concentration, its concentration is not critical to molybdenite bioleaching.

Based on the shake flask test results, Fe(III) concentrations of 2.5 g/L to over 20 g/L are optimal for molybdenite bioleaching—assuming solution redox potentials also are high. However, the threshold concentration is expected to vary with the rate of ferric iron consumption. This will be affected by molybdenite loading and the presence of other sulfide minerals.

Furthermore, the effects of ferric iron to molybdenum ratio on molybdenite bioleaching have been analyzed. Ferrous iron (6 g/L) was biooxidized when added with soluble Mo (2.7 to 2.8 g/L) to a solution containing 11.3 g/L ferric iron. This represents a Fe(III):Mo molar ratio of about 7:1. Bioleaching of molybdenite occurred at 4.4 g/L dissolved Mo in a high ORP (860 mV SHE) solution containing 18 g/L Fe—again a molar ratio of Fe(III) to Mo of about 7:1. Conversely, ferrous iron (4 g/L) was not biooxidized if added with 1.1 g/L Mo to a solution containing 3 g/L Fe(III)—a Fe(III) to Mo molar ratio of 4.7 to 1. The ratio of Fe(III) to Mo is important to molybdenite bioleaching as the presence of Fe(III) reduces the toxicity of Mo to ore bioleaching organisms. Based on the shake flask test results, a solution Fe(III) to Mo molar ratio of 7:1 or more is optimal for reducing Mo toxicity thus enabling biooxidation of iron and the resulting bioleaching of molybdenite. Contrary, the ratio of Fe(II) to Mo is not as important as Fe(II) was found not to protect cells from Mo toxicity. In the absence of significant concentrations of ferric iron, Mo inhibits Fe(II) biooxidation. For example, 6 g/L Fe(II) was not biooxidized in the presence of 0.1 g/L Mo—a Fe to Mo molar ratio of more than 100:1.

EXAMPLE 10

Figure 20:
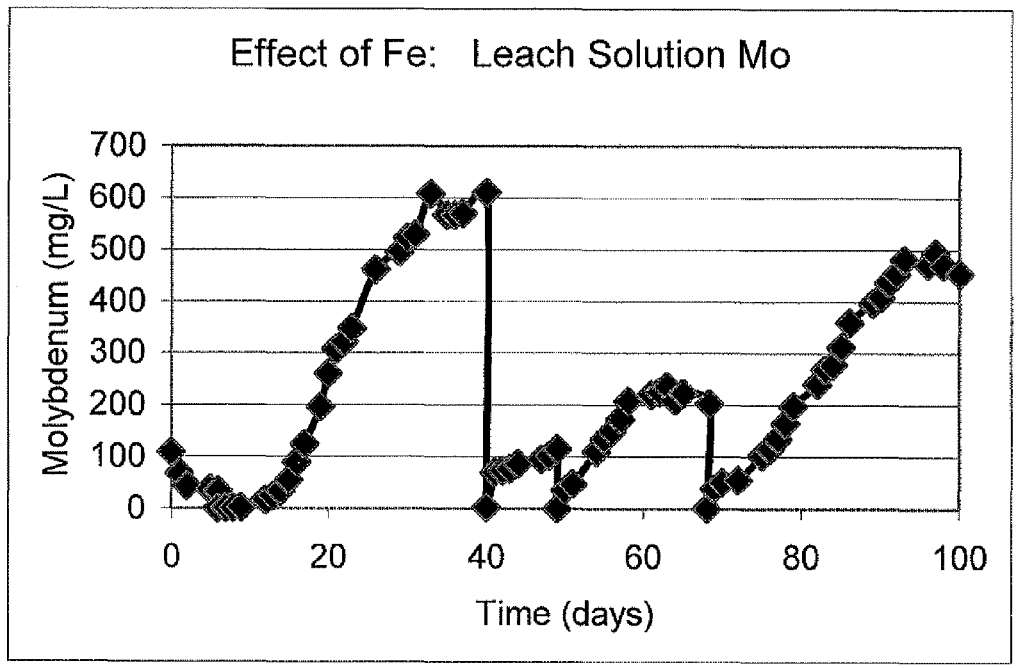
FIG. 20 shows the dissolved molybdenum concentration in a test to determine the effect of solution iron on Mo bioleaching.

The effects of leach solution Fe concentrations and of Fe(III):Mo ratio on molybdenite bioleaching have been investigated in column bioleaching tests. It was not possible to separate the effects of Fe concentration from the ratio of Fe(III) to Mo in leach solutions. The presence of approximately 6 to 7 g/L ferric iron in leach solutions (high ORP) allowed for leaching of up to about 600 mg/L dissolved Mo from molybdenite agglomerated onto support rock before Mo toxicity occurred. This is a molar ratio of Fe to Mo of about 20:1. At lower concentrations of ferric iron (2.5 g/L), lower "plateau" concentrations of Mo accumulated prior to inhibition of the microorganisms by dissolved Mo (0.2 g/L), approximating the same molar ratio (20:1). These plateaus were associated with inhibition of microbial iron oxidation by dissolved molybdenum and reflect the requirement for certain concentrations of Fe(III) to prevent Mo toxicity in columns (FIGS. 19 and 20).

Column 5 also exhibited Mo extraction plateaus in leach solutions that increased with increasing dissolved Fe(III) concentrations and again corresponded to Fe(III) to Mo molar ratios in solution of about 20:1 (FIG. 21). Although iron was added to the system as ferrous sulfate, its oxidation to ferric iron by the microorganisms was critical for molybdenite bioleaching and for increasing tolerance to dissolved Mo.

In summary, column tests showed a requirement for a higher Fe(III) to Mo ratio (20:1) than in shake flask tests (7:1) to prevent Mo toxicity to microorganisms and to allow for bioleaching of molybdenite. This difference probably reflects the much higher solids to solution ratio in columns compared to shake flasks.

The invention claimed is:
1. A method of recovering molybdenum from a material which comprises a molybdenum bearing sulfide, the method comprising the steps of:

(a) contacting the material with an acidic leach solution in the presence of
  (i) at least one iron compound and
  (ii) acidophilic microorganisms being at least capable of oxidizing ferrous iron,
(b) performing a leaching process by controlling a molar ratio of dissolved ferric iron to dissolved molybdenum in said solution, and
(c) producing at least one of a solid and liquid residue from the leaching process, and recovering molybdenum from the residue, and
  the leaching process is performed at a redox potential of at least 700 mV.

2. The method according to claim 1, wherein the material is provided as molybdenum bearing sulfide mineral.

3. The method according to claim 2 wherein the mineral is provided with a particle size of less than 50 μm.

4. The method according to claim 2 wherein the mineral is provided with a specific surface area of at least 3 m²/g.

5. The method according to claim 2 wherein the mineral is provided with a particle size of less than 15 μm, and a specific surface area of at least 10 m²/g.

6. The method according to claim 1, wherein the iron compound comprises ferrous iron or ferric iron.

7. The method according to claim 6, wherein the ferric iron is used at a concentration of 0.5 g/l to 40 g/l.

8. The method according to claim 1, wherein the iron compound comprises ferrous iron bearing sulfide, ferrous ions or ferric ions.

9. The method according to claim 1, wherein the iron compound is provided as ferrous sulfate or ferric sulfate.

10. The method according to claim 1, wherein the iron compound is provided as ferrous iron bearing sulfide mineral.

11. The method according to claim 7, wherein the iron compound is pyrite.

12. The method according to claim 1, which comprises the step of pre-culturing the microorganisms in a culture medium comprising ferrous iron prior to step (a).

13. The method according to claim 1, wherein the microorganisms are obtained from mine waters.

14. The method according to claim 1, wherein the microorganisms are a mixed culture of at least one selected from the group consisting of mesophilic, moderate thermophilic and extreme thermophilic microorganisms.

15. The method according to claim 14, wherein the microorganisms are a mixed culture of at least one of Mesophilic microorganisms and the mesophilic microorganisms are selected from the group consisting of genera *Leptospirillum, Acidithiobacillus, Ferroplasma, Ferrimicrobium*.

16. The method according to claim 14, wherein the microorganisms are a mixed culture of at least one of Mesophilic microorganisms and the mesophilic microorganisms are *Leptospirillum* ("L.") comprising at least one selected from the group consisting of the species *L. ferrooxidans* and *L. ferriphilum*.

17. The method according to claim 16, wherein the process is performed at a temperature of 20° C. to 42° C.

18. The method according to claim 1 wherein in step (b) the molar ratio of ferric iron to molybdenum is controlled to at least 6:1.

19. The method according to claim 1 wherein the process is performed at pH 2.0 or less.

20. The method according to claim 1 wherein in step (b) the molar ratio of ferric iron to molybdenum is controlled to at least 7:1 and the process is performed at a pH of 1.2 to 2.0.

21. The method according to claim 1 wherein the process is performed at a concentration of dissolved molybdenum of less than 4.4 g/l.

22. The method according to claim 21 wherein the concentrations are determined by inductively coupled plasma ("ICP") spectroscopy.

23. The method according to claim 1 wherein in step (b) the molar ratio is monitored on-line.

24. The method according to claim 1, wherein the molar ratio is directly monitored by determining concentrations of dissolved ferric iron and dissolved molybdenum, and correlating them.

25. The method according to claim 1, wherein the molar ratio is indirectly monitored by determining a slurry redox potential.

26. The method according to claim 1 wherein in step (b) the iron compound is fed.

27. The method according to claim 1 wherein in step (c) molybdenum is recovered by using at least one selected from the group consisting of precipitation, ion exchange, solvent extraction and an electrowinning process.

28. The method according to claim 1 which comprises the step of removing a sulfide bearing a heavy metal with a redox potential of less than 700 mV from the material prior to step (a).

29. The method according to claim 28 wherein the sulfide is removed by subjecting the material to a pre-leaching process, and removing the heavy metal form a leach residue of the pre-leaching process.

* * * * *